US012713073B2

(12) United States Patent
Gao et al.

(10) Patent No.: US 12,713,073 B2
(45) Date of Patent: Aug. 18, 2026

(54) IMAGE ENCODER, IMAGE DECODER, IMAGE ENCODING METHOD, AND IMAGE DECODING METHOD

(71) Applicant: Panasonic Intellectual Property Corporation of America, Torrance, CA (US)

(72) Inventors: Jingying Gao, Singapore (SG); Han Boon Teo, Singapore (SG); Chong Soon Lim, Singapore (SG); Praveen Kumar Yadav, Singapore (SG); Kiyofumi Abe, Osaka (JP); Takahiro Nishi, Nara (JP); Tadamasa Toma, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 18/968,346

(22) Filed: Dec. 4, 2024

(65) Prior Publication Data

US 2025/0097475 A1 Mar. 20, 2025

Related U.S. Application Data

(63) Continuation of application No. PCT/JP2023/020484, filed on Jun. 1, 2023.

(Continued)

(51) Int. Cl.

| | |
|---|---|
| ***H04N 19/80*** | (2014.01) |
| ***H04N 19/167*** | (2014.01) |
| ***H04N 19/17*** | (2014.01) |
| ***H04N 19/70*** | (2014.01) |
| ***H04N 19/85*** | (2014.01) |

(52) U.S. Cl.

CPC ........... *H04N 19/80* (2014.11); *H04N 19/167* (2014.11); *H04N 19/17* (2014.11); *H04N 19/70* (2014.11); *H04N 19/85* (2014.11)

(58) Field of Classification Search

CPC ...... H04N 19/80; H04N 19/167; H04N 19/17; H04N 19/70; H04N 19/85; H04N 19/136;

(Continued)

(56) References Cited

U.S. PATENT DOCUMENTS 9,883,207 B2 * 1/2018 Misra ..................... H04N 19/82
10,452,955 B2 * 10/2019 Gao .................. G06F 18/24143

(Continued)

FOREIGN PATENT DOCUMENTS

EP 1 840 875 10/2007

OTHER PUBLICATIONS

Extended European Search Report dated Aug. 11, 2025 in corresponding European Patent Application No. 23819752.9.

(Continued)

*Primary Examiner* — Asmamaw G Tarko
(74) *Attorney, Agent, or Firm* — Wenderoth, Lind & Ponack, L.L.P.

(57) ABSTRACT

An image encoder includes circuitry, and a memory connected to the circuitry. The circuitry, in operation, determines a first region and a second region in an input image, generates a first image from the input image by applying a first prefilter to the first region and a second prefilter to the second region, determines a first parameter relating to the first region and a second parameter relating to the second region, and generates a bitstream by encoding the first region based on the first parameter, encoding the second region based on the second parameter, encoding the first prefilter or a first postfilter corresponding to the first prefilter, and encoding the second prefilter or a second postfilter corresponding to the second prefilter.

22 Claims, 32 Drawing Sheets

Related U.S. Application Data

(60) Provisional application No. 63/350,073, filed on Jun. 8, 2022.

(58) Field of Classification Search
CPC .. H04N 19/159; H04N 19/119; H04N 19/124; H04N 19/176; H04N 19/46; H04N 19/82; H04N 19/117
USPC ..................................................... 375/240.26
See application file for complete search history.

(56) References Cited

U.S. PATENT DOCUMENTS

2009/0097542 A1* 4/2009 Lei ......................... H04N 19/61 375/240
2019/0098302 A1* 3/2019 Alakuijala ........... H04N 19/172
2019/0215517 A1* 7/2019 Ramasubramonian ...................... H04N 19/186
2020/0029096 A1* 1/2020 Rusanovskyy ........ H04N 19/52
2024/0223766 A1* 7/2024 Teo ...................... H04N 19/132
2025/0071272 A1* 2/2025 Gao ....................... H04N 19/85

OTHER PUBLICATIONS

Jin Young Lee, et al., "[VCM] VCM description and scope", ISO/IEC JTC 1/SC 29/WG 2, No. m58158, XP030298889, Oct. 12, 2021, pp. 1-3.

International Search Report issued Aug. 15, 2023 in corresponding International Application No. PCT/JP2023/020484.

* cited by examiner

10
IMAGE ENCODER
11
D1
REGION SETTING UNIT
12
D1, D2
D20
PREFILTER PROCESSING UNIT
D4
13
D3, D2
14
PARAMETER SETTING UNIT
CONVERSION UNIT
15
D3, D6
ENCODING PROCESSING UNIT
D5
D7
Nw
D7
20
21
DECODING PROCESSING UNIT
22
D8, D9, D10
D20
POSTFILTER PROCESSING UNIT
23
D11
D20
TASK PROCESSING UNIT
D12
IMAGE DECODER

FIG.3
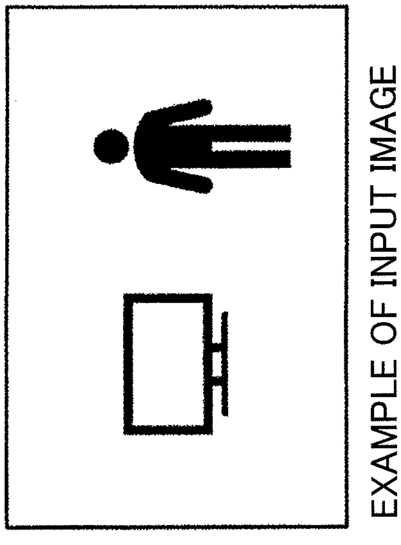
EXAMPLE OF INPUT IMAGE
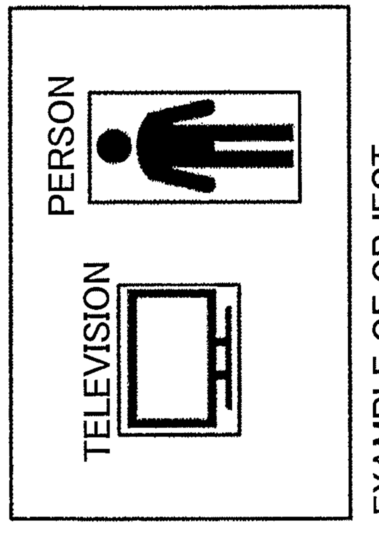
EXAMPLE OF OBJECT DETECTION TASK
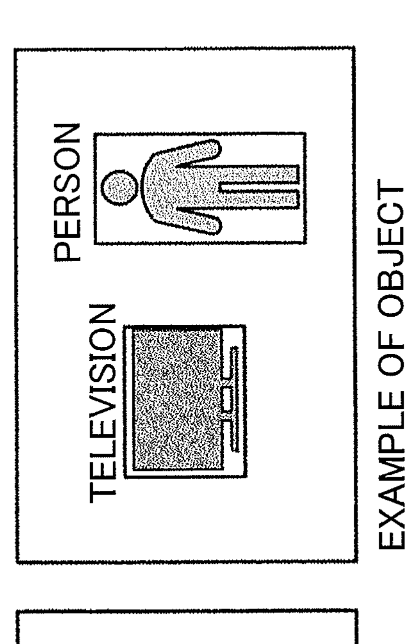
EXAMPLE OF OBJECT SEGMENTATION TASK FIG.4
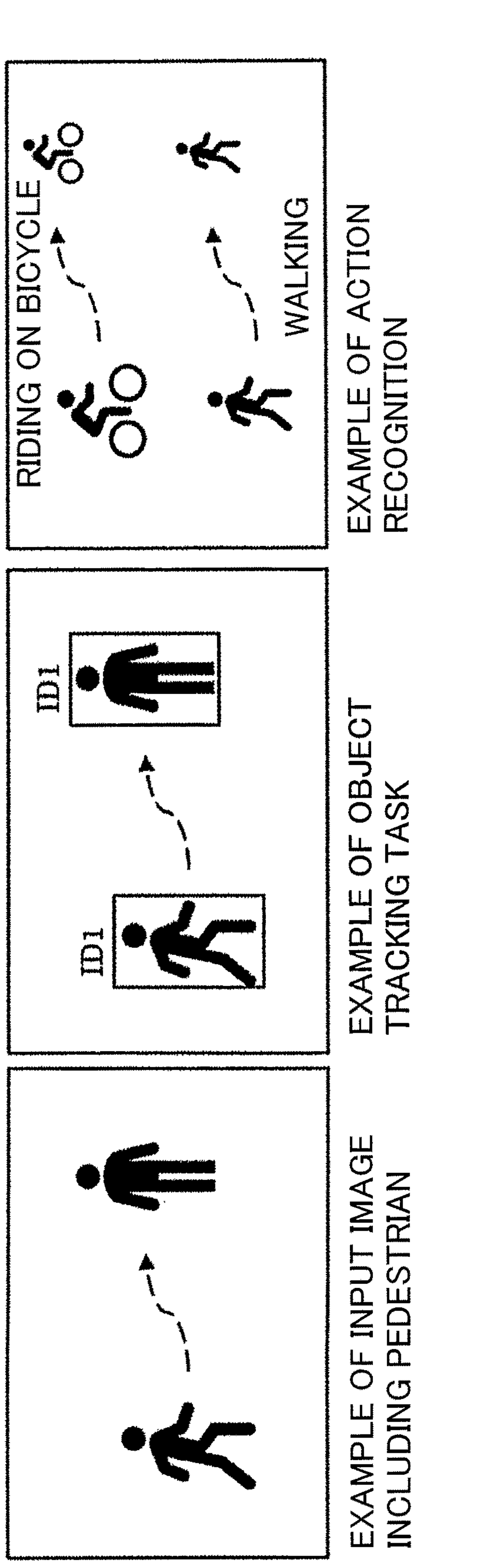
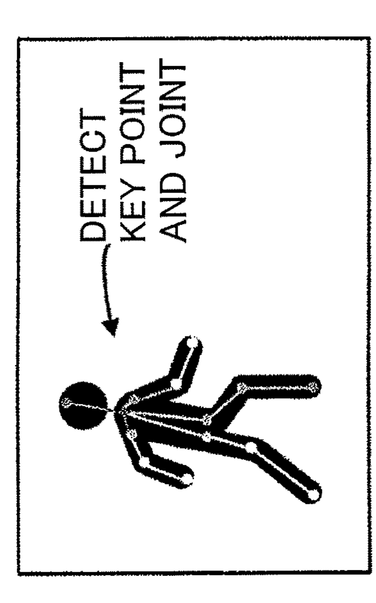
EXAMPLE OF POSE ESTIMATION TASK

| | | | | |
|---|---|---|---|---|
| 2 | 4 | 5 | 4 | 2 |
| 4 | 9 | 12 | 9 | 4 |
| 5 | 12 | 15 | 12 | 5 |
| 4 | 9 | 12 | 9 | 4 |
| 2 | 4 | 5 | 4 | 2 |

FIG.5G

| | | | | |
|---|---|---|---|---|
| 1 | 4 | 7 | 4 | 1 |
| 4 | 16 | 26 | 16 | 4 |
| 7 | 26 | 41 | 26 | 7 |
| 4 | 16 | 26 | 16 | 4 |
| 1 | 4 | 7 | 4 | 1 |

| | | | | | | |
|---|---|---|---|---|---|---|
| 0 | 0 | 1 | 1 | 1 | 0 | 0 |
| 0 | 1 | 3 | 3 | 3 | 1 | 0 |
| 1 | 3 | 0 | -7 | 0 | 3 | 1 |
| 1 | 3 | -7 | -24 | -7 | 3 | 1 |
| 1 | 3 | 0 | -7 | 0 | 3 | 1 |
| 0 | 1 | 3 | 3 | 3 | 1 | 0 |
| 0 | 0 | 1 | 1 | 1 | 0 | 0 |

FIG.6

| MACHINE TASK | FILTER |
|---|---|
| OBJECT DETECTION | NOISE REMOVAL (WEAK) + SHARPENING (WEAK) |
| OBJECT SEGMENTATION | NOISE REMOVAL (WEAK) |
| OBJECT TRACKING | NOISE REMOVAL (STRONG) + SHARPENING (WEAK) |
| ACTION RECOGNITION | NOISE REMOVAL (STRONG) + SHARPENING (STRONG) |
| POSE ESTIMATION | SHARPENING (STRONG) |

FIG.7A

| -1 | -1 | -1 |
|---|---|---|
| -1 | 9 | -1 |
| -1 | -1 | -1 |

FILTER STRENGTH = 9

FIG.7B

| -1 | -2 | -1 |
|---|---|---|
| -2 | 15 | -2 |
| -1 | -2 | -1 |

FILTER STRENGTH = 5

D4A

| 1 | 2 | 1 |
|---|---|---|

↔

D5A

| -1 | 4 | -1 |
|---|---|---|

Figure 9A:
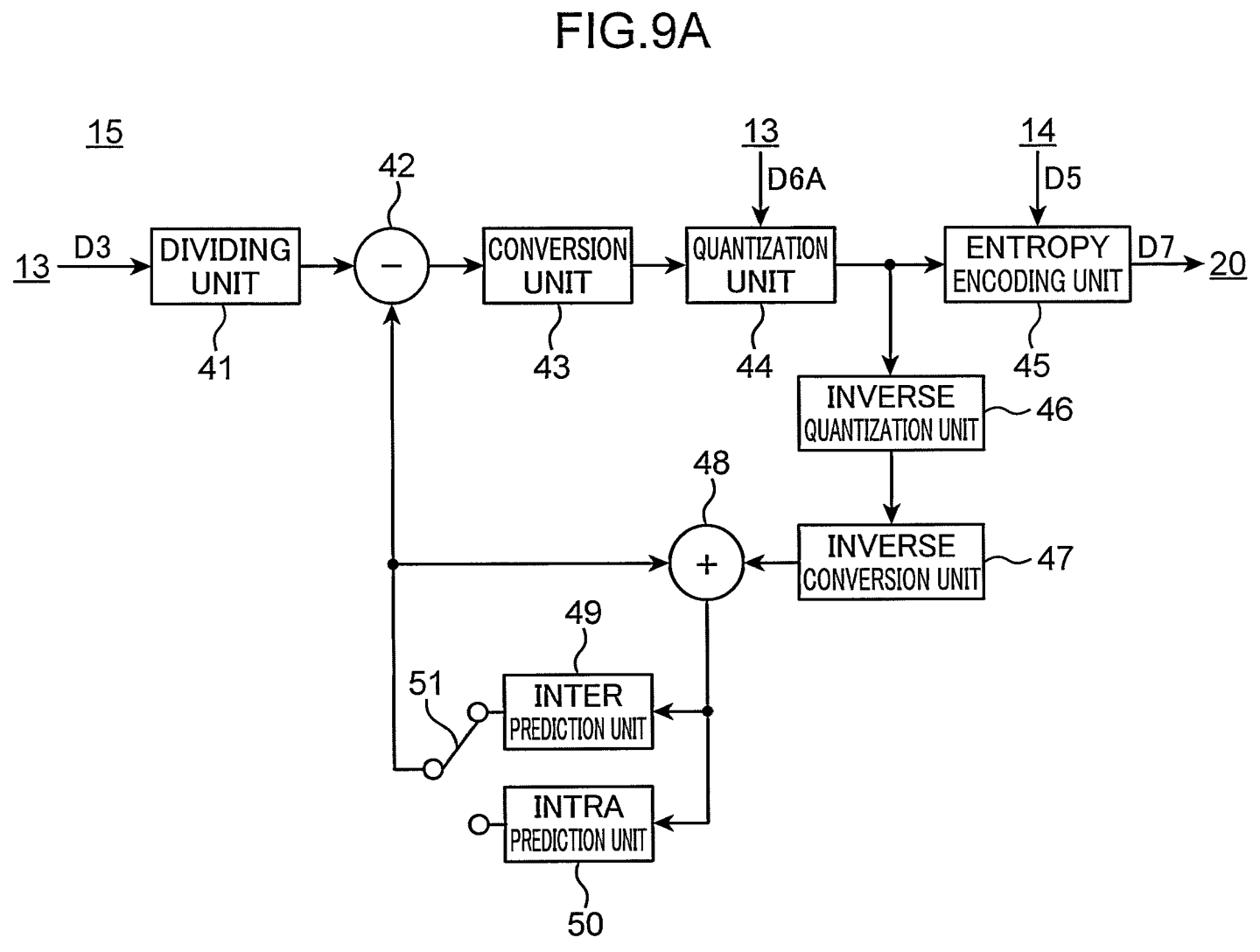

FIG.9A 15
13
D3
DIVIDING UNIT
41
42
CONVERSION UNIT
43
13
D6A
QUANTIZATION UNIT
44
14
D5
ENTROPY ENCODING UNIT
45
D7
20
INVERSE QUANTIZATION UNIT
46
INVERSE CONVERSION UNIT
47
48
INTER PREDICTION UNIT
49
INTRA PREDICTION UNIT
50
51

Figure 9B:
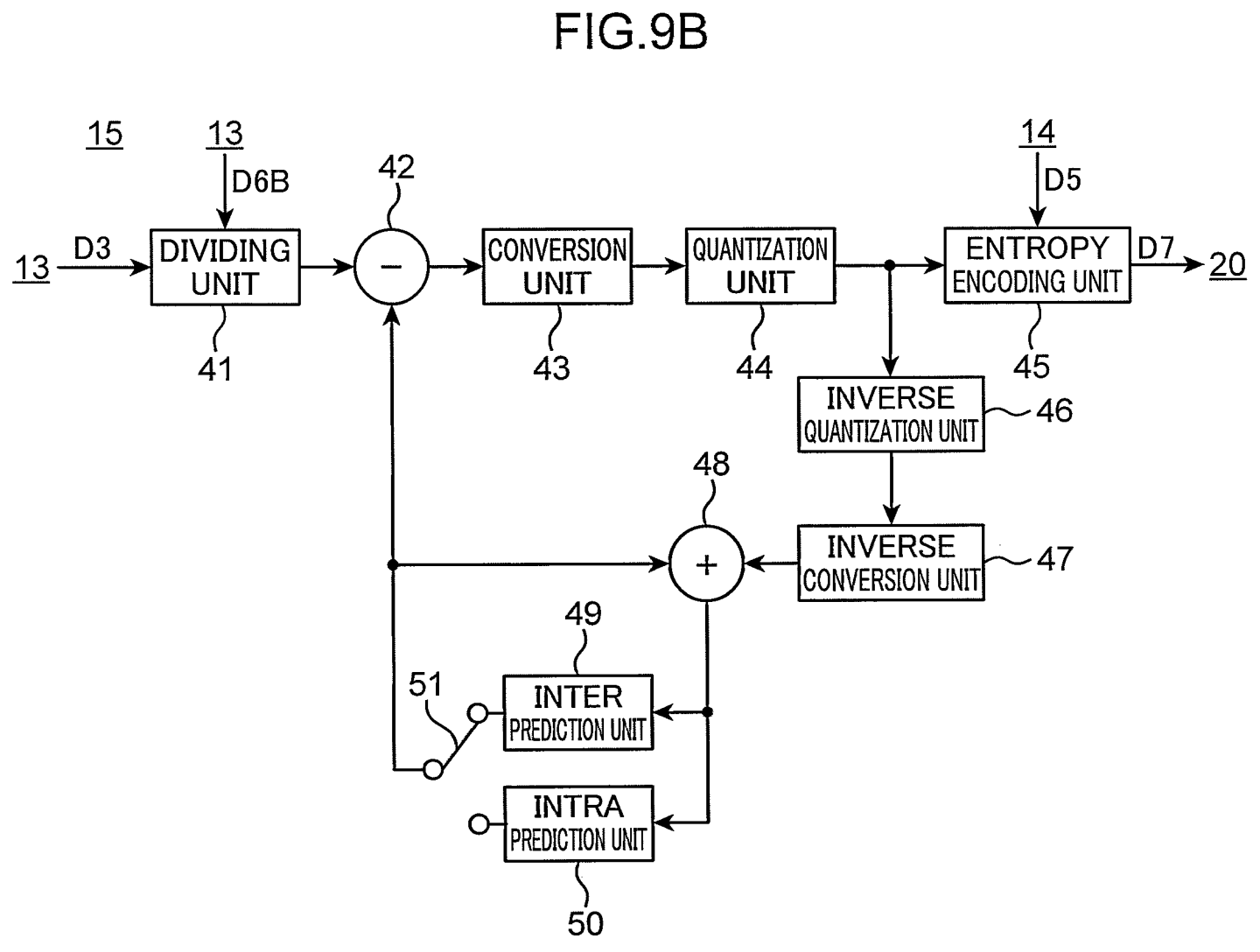

DIVIDING UNIT 41

42

CONVERSION UNIT 43

QUANTIZATION UNIT 44

14 D5

ENTROPY ENCODING UNIT 45

D7 20

INVERSE QUANTIZATION UNIT 46

INVERSE CONVERSION UNIT 47

48

49 INTER PREDICTION UNIT

INTRA PREDICTION UNIT 50

Figure 9C:
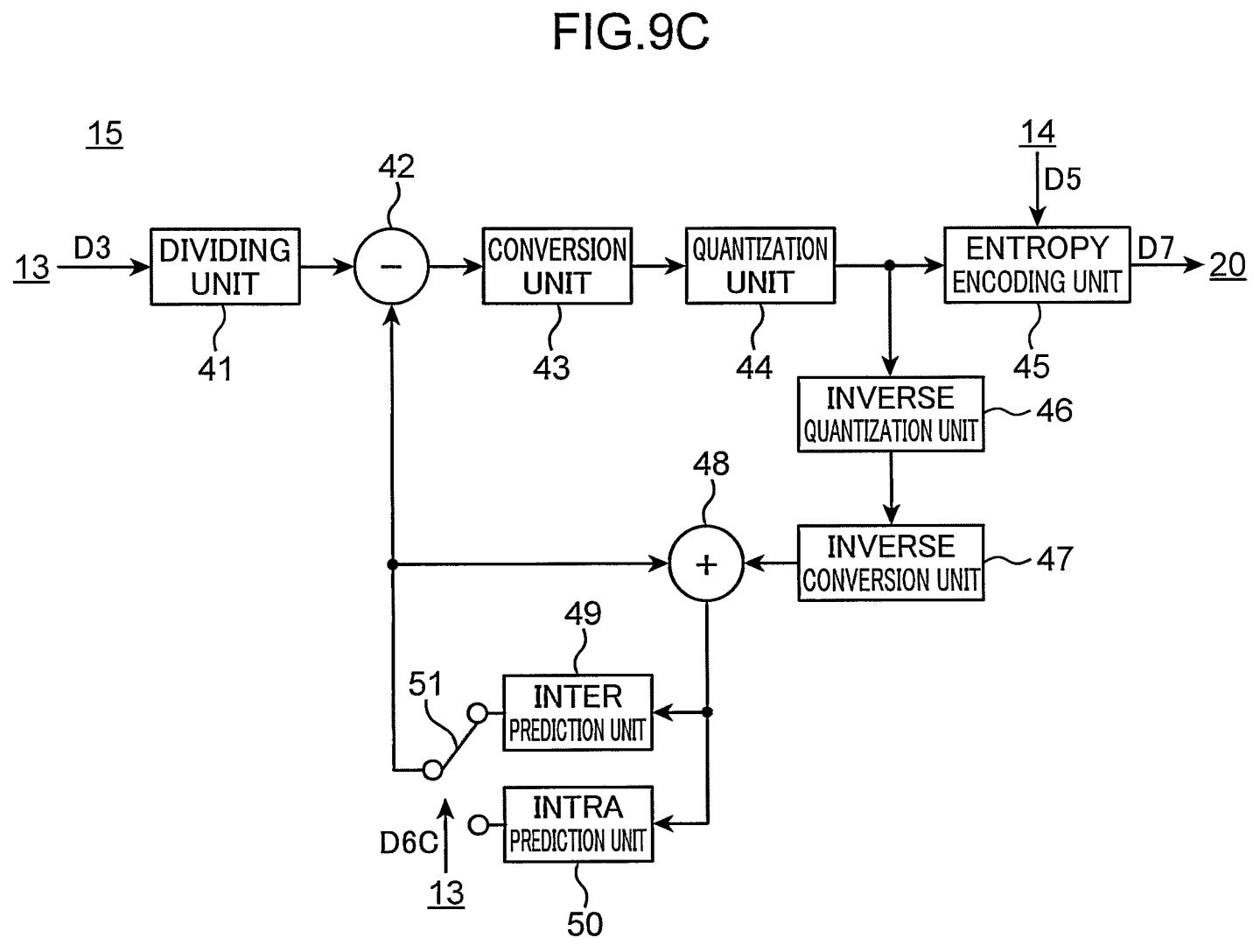

DIVIDING UNIT 41

42 −

CONVERSION UNIT 43

QUANTIZATION UNIT 44

14 D5

ENTROPY ENCODING UNIT 45

D7 20

INVERSE QUANTIZATION UNIT 46

INVERSE CONVERSION UNIT 47

48 +

INTER PREDICTION UNIT 49

INTRA PREDICTION UNIT 50

Figure 9D:
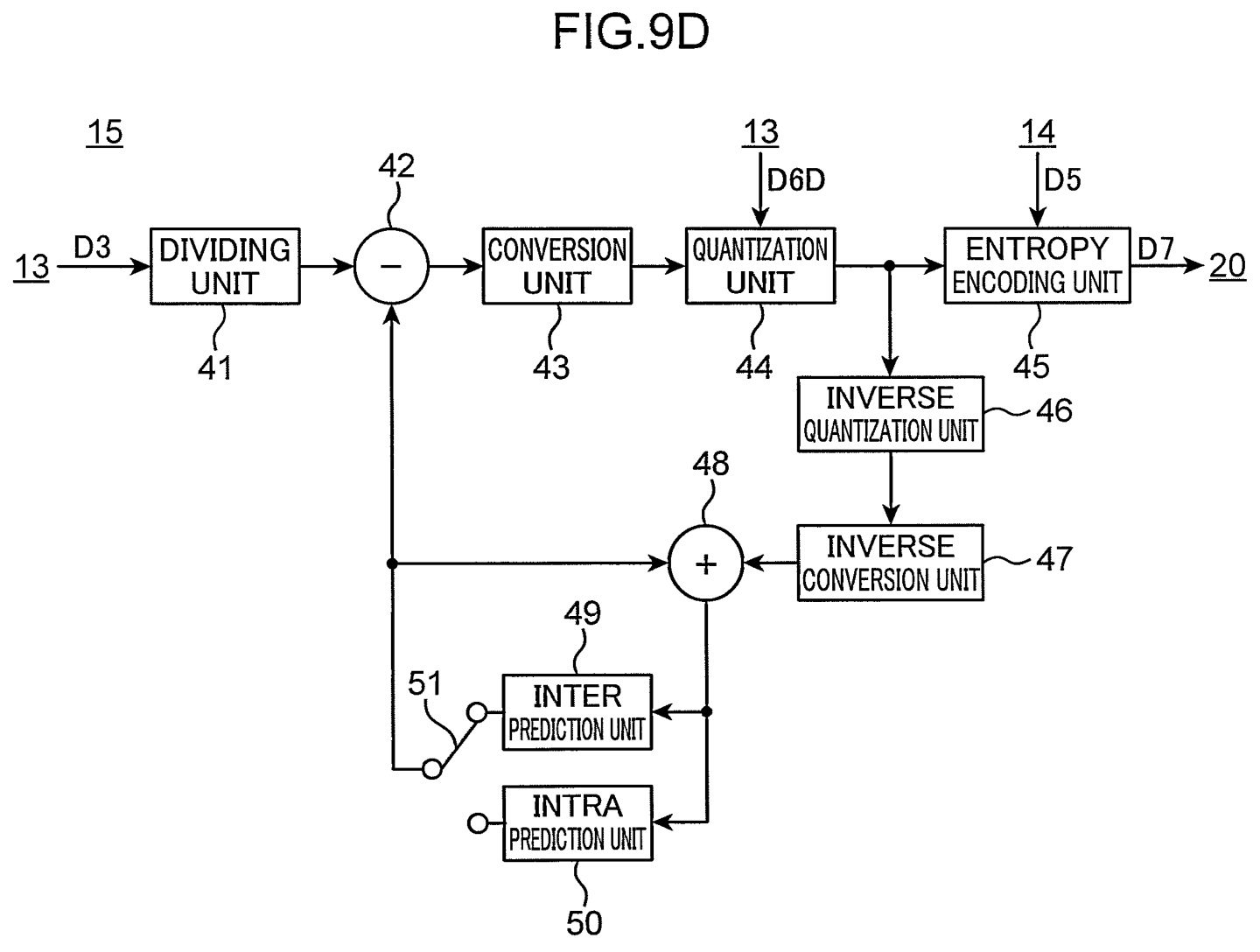

13
D3
DIVIDING UNIT
41
42
CONVERSION UNIT
43
13
D6D
QUANTIZATION UNIT
44
14
D5
ENTROPY ENCODING UNIT
45
D7
20
INVERSE QUANTIZATION UNIT
46
INVERSE CONVERSION UNIT
47
48
INTER PREDICTION UNIT
49
INTRA PREDICTION UNIT
50
51

Figure 9E:
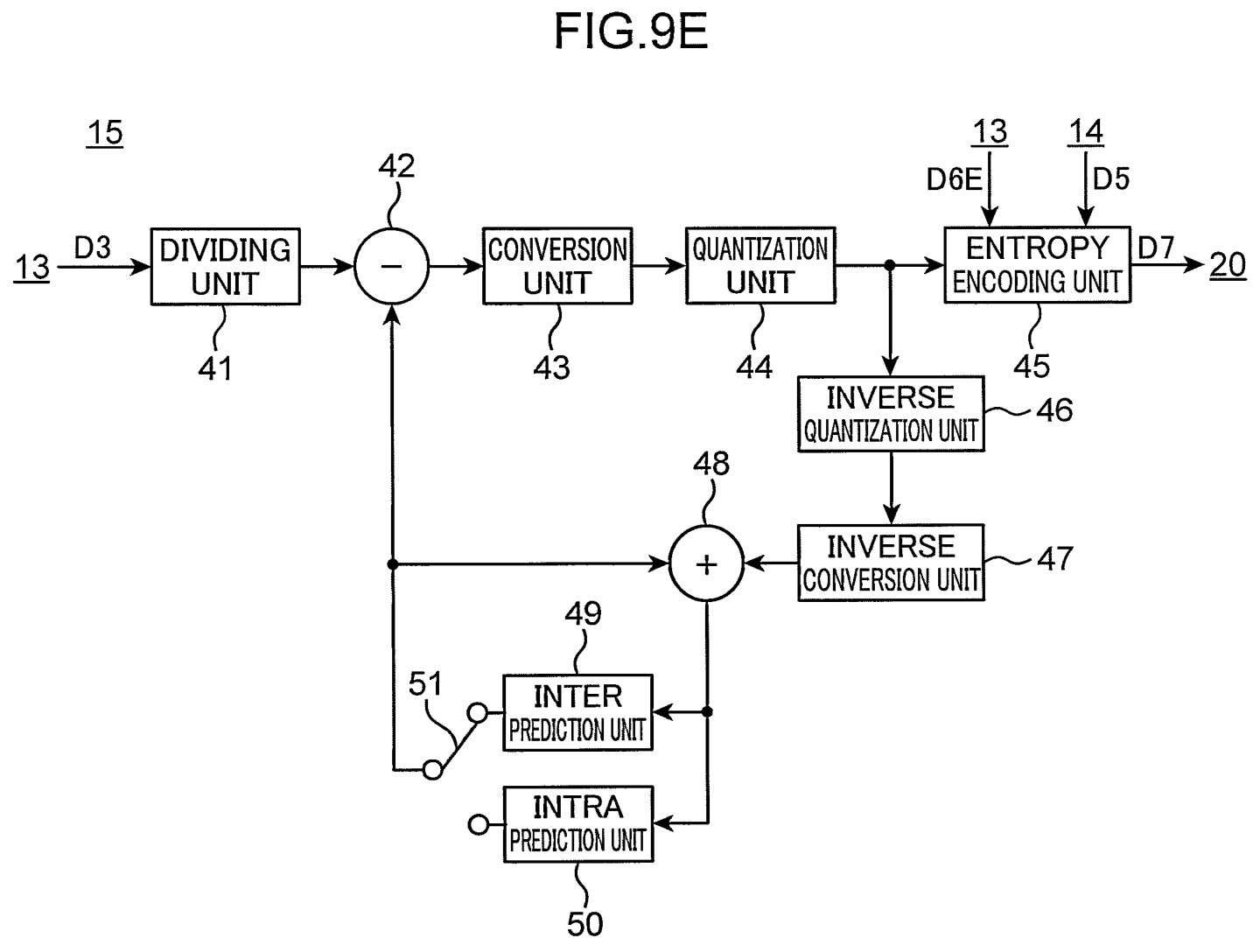

13 D3 DIVIDING UNIT 41

42 −

CONVERSION UNIT 43

QUANTIZATION UNIT 44

ENTROPY ENCODING UNIT 45

13 D6E

14 D5

D7 20

INVERSE QUANTIZATION UNIT 46

INVERSE CONVERSION UNIT 47

48 +

INTER PREDICTION UNIT 49

INTRA PREDICTION UNIT 50

| QUANTIZATION PARAMETER | FILTER INDEX |
|---|---|
| 0 | 0 |
| 1 | 1 |
| 2 | 2 |
| 3 | 3 |
| 4 | 4 |
| 5 | 5 |
| 6 | 6 |

| QUANTIZATION PARAMETER | FILTER INDEX |
|---|---|
| EVEN NUMBER | 0 |
| ODD NUMBER | 1 |

FIG.15

| TOTAL NUMBER OF PIXELS (X × Y) | FILTER INDEX |
|---|---|
| 16 | 0 |
| 32 | 1 |
| 64 | 2 |
| 128 | 3 |
| 256 | 4 |
| 512 | 5 |
| 1024 | 6 |
| 2048 | 7 |
| 4096 | 8 |
| 8192 | 9 |
| 16384 | 10 |

FIG.16

| ASPECT RATIO(X/Y) | FILTER INDEX |
|---|---|
| 1/32 | 0 |
| 1/16 | 1 |
| 1/8 | 2 |
| 1/4 | 3 |
| 1/2 | 4 |
| 1 | 5 |
| 2 | 6 |
| 4 | 7 |
| 8 | 8 |
| 16 | 9 |
| 32 | 10 |

FIG.17

| | | NUMBER OF VERTICAL PIXELS (Y) | | | | | |
|---|---|---|---|---|---|---|---|
| | | 4 | 8 | 16 | 32 | 64 | 128 |
| NUMBER OF HORIZONTAL PIXELS (X) | 4 | 0 | 1 | 2 | 3 | 4 | 5 |
| | 8 | 6 | 7 | 8 | 9 | 10 | 11 |
| | 16 | 12 | 13 | 14 | 15 | 16 | 17 |
| | 32 | 18 | 19 | 20 | 21 | 22 | 23 |
| | 64 | 24 | 25 | 26 | 27 | 28 | 29 |
| | 128 | 30 | 31 | 32 | 33 | 34 | 35 |

FIG.18

| PREDICTION TYPE | FILTER INDEX |
| --- | --- |
| INTRA PREDICTION | 0 |
| INTER PREDICTION | 1 |

FIG.19

| BOUNDING BOX | FILTER INDEX |
| --- | --- |
| IN | 0 |
| OUT | 1 |

FIG.21

<table>
<tr><th>Prefilter_info(payloadsize){</th><th>Descriptor</th></tr>
<tr><td>prefilter_type_idc</td><td>u(3)</td></tr>
<tr><td>if (prefilter_type_idc == 0 || prefilter_type_idc == 1 || prefilter_type_idc == 2 ) {</td><td></td></tr>
<tr><td>filter_strength_level_idc</td><td>u(3)</td></tr>
<tr><td>}</td><td></td></tr>
<tr><td>if (prefilter_type_idc == 3) {</td><td></td></tr>
<tr><td>input_bit_depth_minus8</td><td>u(3)</td></tr>
<tr><td>}</td><td></td></tr>
<tr><td>if (prefilter_type_idc == 4) {</td><td></td></tr>
<tr><td>input_color_format_idc</td><td>u(3)</td></tr>
<tr><td>}</td><td></td></tr>
<tr><td>if (prefilter_type_idc == 5) {</td><td></td></tr>
<tr><td>scale_factor_nominator</td><td>u(3)</td></tr>
<tr><td>scale_factor_denominator</td><td>u(3)</td></tr>
<tr><td>}</td><td></td></tr>
<tr><td>}</td><td></td></tr>
</table>

FIG.22

| prefilter_hint(payloadsize){ | Descriptor |
| --- | --- |
| prefilter_hint_size_y | ue(v) |
| prefilter_hint_size_x | ue(v) |
| prefilter_hint_type | u(2) |
| for( cIdx = 0; cIdx < ( chroma_format_idc = = 0 ? 1 : 3 ); cIdx++ ) | |
| for( cy = 0; cy < prefilter_hint_size_y; cy++ ) | |
| for( cx = 0; cx < prefilter_hint_size_x; cx++ ) | |
| prefilter_hint_value[ cIdx ][ cy ][ cx ] | se(v) |
| } | |

FIG.24

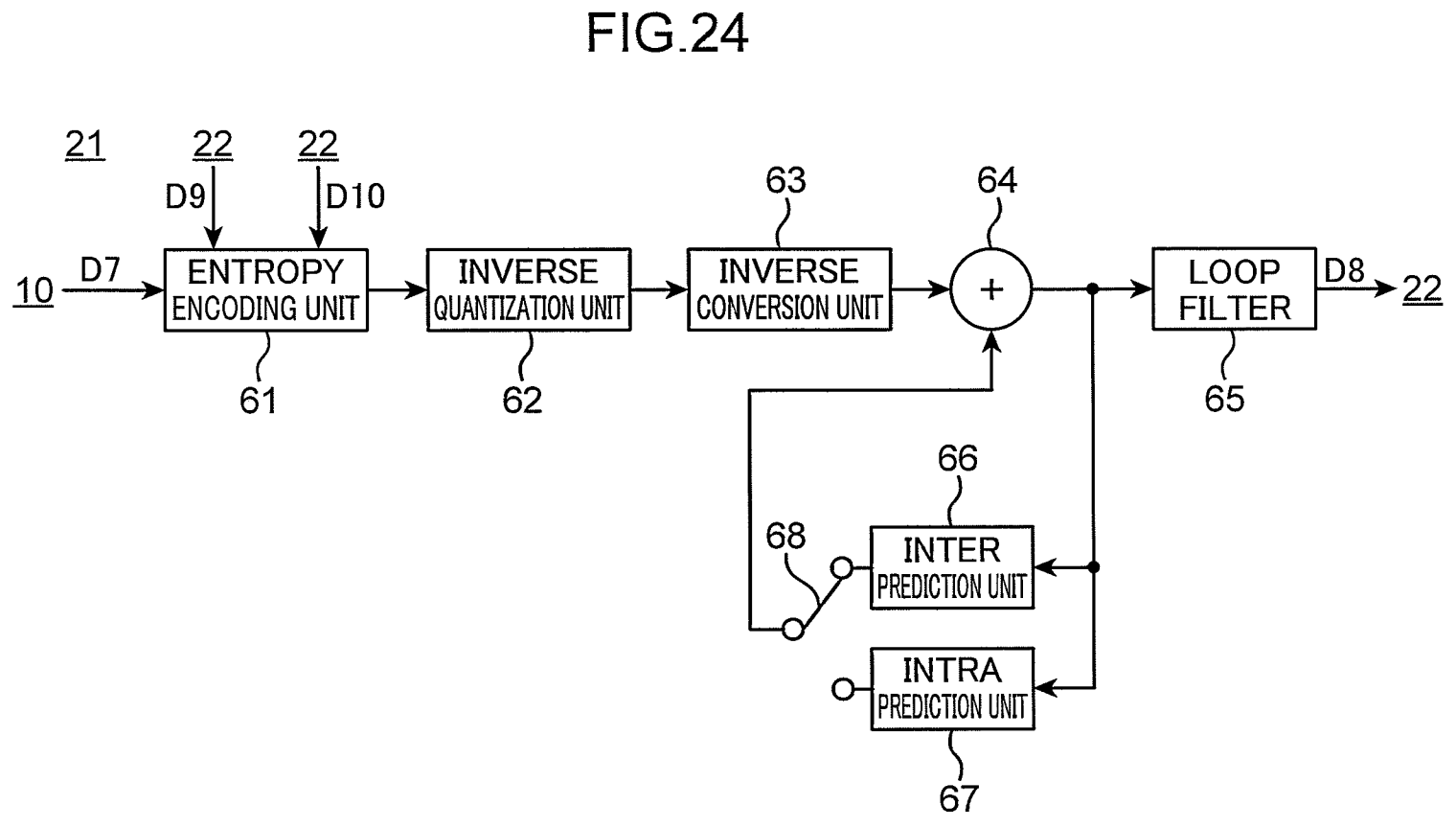

21
10
D7
D9
22
D10
22
ENTROPY ENCODING UNIT
61
INVERSE QUANTIZATION UNIT
62
INVERSE CONVERSION UNIT
63
+
64
LOOP FILTER
65
D8
22
INTER PREDICTION UNIT
66
INTRA PREDICTION UNIT
67
68

IMAGE ENCODER, IMAGE DECODER, IMAGE ENCODING METHOD, AND IMAGE DECODING METHOD

FIELD OF INVENTION

The present disclosure relates to an image encoder, an image decoder, an image encoding method, and an image decoding method.

BACKGROUND ART

Patent Literature 1 discloses a video encoding method and a decoding method using an adaptive coupled prefilter and postfilter.

Patent Literature 2 discloses an encoding method of image data for loading into an artificial intelligence (AI) integrated circuit.

Patent Literature 1: U.S. Pat. No. 9,883,207

Patent Literature 2: U.S. Pat. No. 10,452,955

SUMMARY OF THE INVENTION

An object of the present disclosure is to apply an appropriate prefilter and postfilter in accordance with image characteristics such as importance of each region in an image.

An image encoder according to one aspect of the present disclosure includes circuitry, and a memory connected to the circuitry, wherein the circuitry, in operation, determines a first region and a second region in an input image, generates a first image from the input image by applying a first prefilter to the first region and a second prefilter to the second region, determines a first parameter relating to the first region and a second parameter relating to the second region, and generates a bitstream by encoding the first region based on the first parameter, encoding the second region based on the second parameter, encoding the first prefilter or a first postfilter corresponding to the first prefilter, and encoding the second prefilter or a second postfilter corresponding to the second prefilter.

BRIEF DESCRIPTION OF THE DRAWINGS

FIG. 3 is a diagram illustrating object detection and object segmentation as examples of machine task.

FIG. 4 is a diagram illustrating object tracking, action recognition, and pose estimation as examples of the machine task.

FIG. 5A is a diagram illustrating an example of a plurality of prefilters of different types.

FIG. 5B is a diagram illustrating an example of the plurality of prefilters of different types.

FIG. 5C is a diagram illustrating an example of the plurality of prefilters of different types.

FIG. 5F is a diagram illustrating an example of the plurality of prefilters of different types.

FIG. 5G is a diagram illustrating an example of the plurality of prefilters of different types.

FIG. 6 illustrates an example of a lookup table for defining selection of a prefilter set based on image usage.

FIG. 7A is a diagram illustrating an example of a sharpening filter having a strong filter strength.

FIG. 7B is a diagram illustrating an example of a sharpening filter having a weak filter strength.

FIG. 9A is a diagram illustrating a first configuration example of an encoding processing unit in a simplified manner.

FIG. 9B is a diagram illustrating a second configuration example of the encoding processing unit in a simplified manner.

FIG. 9C is a diagram illustrating a third configuration example of the encoding processing unit in a simplified manner.

FIG. 9D is a diagram illustrating a fourth configuration example of the encoding processing unit in a simplified manner.

FIG. 9E is a diagram illustrating a fifth configuration example of the encoding processing unit in a simplified manner.

FIG. 10 is a table showing a first example of a parameter setting method relating to the first configuration example illustrated in FIG. 9A.

FIG. 11 is a table showing a second example of the parameter setting method relating to the first configuration example illustrated in FIG. 9A.

FIG. 15 is a table showing a first example of the parameter setting method relating to the second configuration example illustrated in FIG. 9B.

FIG. 16 is a table showing a second example of the parameter setting method relating to the second configuration example illustrated in FIG. 9B.

FIG. 17 is a table showing a third example of the parameter setting method relating to the second configuration example illustrated in FIG. 9B.

FIG. 18 is a table showing an example of the parameter setting method relating to the third configuration example illustrated in FIG. 9C.

FIG. 19 is a table showing an example of the parameter setting method relating to the fourth configuration example illustrated in FIG. 9D and the fifth configuration example illustrated in FIG. 9E.

FIG. 21 is a table showing an example of a supplemental enhancement information (SEI) message syntax relating to filter information.

FIG. 22 is a table showing an example of the SEI message syntax regarding the filter information.

FIG. 24 is a diagram illustrating a configuration example of a decoding processing unit in a simplified manner.

DETAILED DESCRIPTION

Knowledge Underlying Present Disclosure

Figure 1:
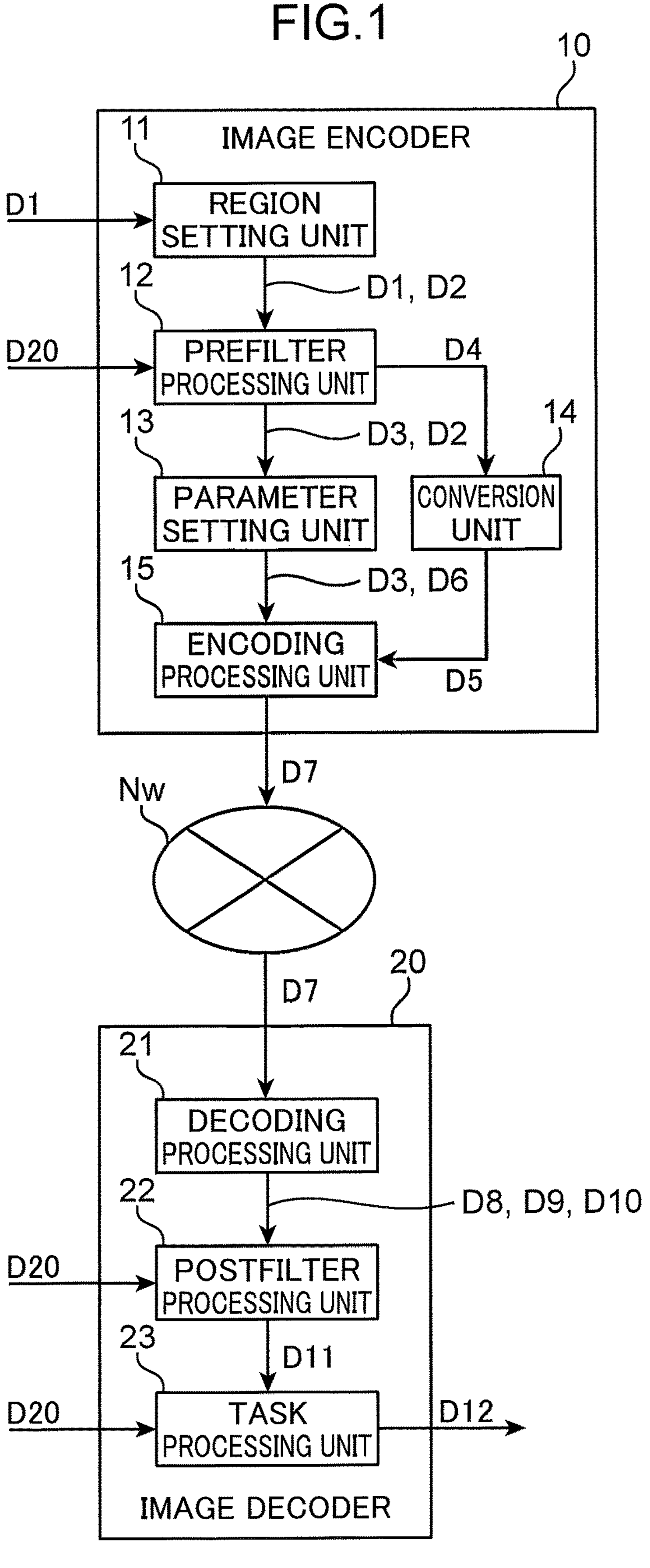
FIG. 1 is a diagram illustrating a simplified configuration of an image processing system according to an embodiment of the present disclosure.

A conventional encoding method has aimed to provide optimal video under bit rate constraints for human vision.

With the progress of machine learning or neural network-based applications along with abundant sensors, many intelligent platforms that handle large amounts of data, including connected cars, video surveillance, and smart cities have been implemented. Since large amounts of data are constantly generated, the conventional method involving humans in pipelines has become inefficient and unrealistic in terms of latency and scale.

Furthermore, in transmission and archive systems, there is a concern that more compact data representation and low-latency solutions are required, and therefore, video coding for machines (VCM) has been introduced.

In some cases, machines can communicate with each other and execute tasks without human intervention, while in other cases, additional processing by humans may be necessary for decompressed specific streams. Such cases include a case where for example, in surveillance cameras, a human "supervisor" searches for a specific person or scene in a video.

In other cases, corresponding bitstreams are used by both humans and machines. For connected cars, features can be used for image correction functions for humans and used for object detection and segmentation for machines.

Typical system architecture includes a pair of image encoder and image decoder. The input of the system is a video, a still image, or a feature quantity. Examples of a machine task include object detection, object segmentation, object tracking, action recognition, pose estimation, or a discretionary combination thereof. There is a possibility that human vision is one of the use cases that can be used along with the machine task.

The related art has a problem that a prefilter applied to an input image in an image encoder or a postfilter applied to a decoded image in an image decoder cannot be dynamically changed.

In order to solve such a problem, the present inventors have found that the above problem can be solved by setting a plurality of regions in an image in accordance with image characteristics such as importance in a machine task and dynamically changing a prefilter or postfilter for each region, and have arrived at the present disclosure.

Next, each aspect of the present disclosure will be described.

An image encoder according to a first aspect of the present disclosure includes circuitry, and a memory connected to the circuitry, wherein the circuitry, in operation, determines a first region and a second region in an input image, generates a first image from the input image by applying a first prefilter to the first region and a second prefilter to the second region, determines a first parameter relating to the first region and a second parameter relating to the second region, and generates a bitstream by encoding the first region based on the first parameter, encoding the second region based on the second parameter, encoding the first prefilter or a first postfilter corresponding to the first prefilter, and encoding the second prefilter or a second postfilter corresponding to the second prefilter.

According to the first aspect, an appropriate prefilter can be applied to each of a plurality of regions in the input image.

In an image encoder according to a second aspect of the present disclosure, in the first aspect, the circuitry selects a prefilter set including the first prefilter and the second prefilter from among a plurality of prefilter sets based on usage information indicating image usage at an image decoder side.

According to the second aspect, the prefilter to be applied to the input image can be changed in accordance with the image usage.

In an image encoder according a third aspect of the present disclosure, in the second aspect, the image usage may include at least one machine task and human vision.

According to the third aspect, it is possible to not only select the prefilter suitable for the machine task but also select the prefilter suitable for human vision.

In an image encoder according to a fourth aspect of the present disclosure, in any one of the first to third aspects, the first parameter and the second parameter each may include at least one of a quantization parameter, a partitioning size, a prediction type, and a bounding box.

According to the fourth aspect, not only an appropriate prefilter can be applied to each of the plurality of regions in the input image, but also appropriate encoding processing can be executed.

In an image encoder according to a fifth aspect of the present disclosure, in the fourth aspect, the first parameter and the second parameter each may include the quantization parameter, and the circuitry may determine a value of the quantization parameter, or a parity of the quantization parameter based on the first prefilter or the second prefilter.

According to the fifth aspect, the quantization parameters to be applied to the first region and the second region of the first image can be easily set in accordance with the first prefilter or the second prefilter having been applied.

In an image encoder according to a sixth aspect of the present disclosure, in the fourth aspect, the first parameter and second parameter each may include the partitioning size, and the circuitry may determine a total number of pixels of the partitioning size, an aspect ratio of the partitioning size, or a number of horizontal pixels and a number of vertical pixels of the partitioning size based on the first prefilter or the second prefilter.

According to the sixth aspect, the partitioning sizes to be applied to the first region and the second region of the first image can be easily set in accordance with the first prefilter or the second prefilter having been applied.

In an image encoder according to a seventh aspect of the present disclosure, in the fourth aspect, the first parameter and the second parameter each may include the prediction type, and the circuitry may determine an intra prediction or an inter prediction as the prediction type based on the first prefilter or the second prefilter.

According to the seventh aspect, the prediction types to be applied to the first region and the second region of the first image can be easily set in accordance with the first prefilter or the second prefilter having been applied.

In an image encoder according to an eighth aspect of the present disclosure, in the fourth aspect, the first parameter and the second parameter each may include the bounding box, and the circuitry may determine the bounding box based on the first prefilter or the second prefilter.

According to the eighth aspect, the bounding box to be set in the first image can be easily set in accordance with the first prefilter or the second prefilter having been applied.

In an image encoder according to a ninth aspect of the present disclosure, in any one of the first to eighth aspects, the circuitry may store filter information in a header of the bitstream, the filter information relating to the first prefilter or the first postfilter and the second prefilter or the second postfilter.

According to the ninth aspect, by storing the filter information in the header of the bitstream, the image decoder can easily decode the filter information from the bitstream.

In an image encoder according to a tenth aspect of the present disclosure, in the ninth aspect, the filter information may include usage information indicating image usage at an image decoder side, the image usage being that of when a prefilter set including the first prefilter and the second prefilter is selected from a plurality of prefilter sets.

According to the tenth aspect, the prefilter to be applied to the input image can be changed in accordance with the image usage.

In an image encoder according to an eleventh aspect of the present disclosure, in the ninth aspect, the header may include a supplemental enhancement information (SEI) region, and the circuitry may store the filter information in the SEI region.

According to the eleventh aspect, the filter information can be easily handled as additional information by storing the filter information in the SEI region.

An image decoder according to a twelfth aspect of the present disclosure includes circuitry, and a memory connected to the circuitry, wherein the circuitry, in operation, decodes a first prefilter or a first postfilter corresponding to the first prefilter, a second prefilter or a second postfilter corresponding to the second prefilter, a first parameter, and a second parameter from a bitstream, decodes a first region of a first image from the bitstream based on the first parameter, and decodes a second region of the first image from the bitstream based on the second parameter, and generates a second image by applying a first postfilter corresponding to the first prefilter decoded from the bitstream or the first postfilter decoded from the bitstream to the first region of the first image, and applying a second postfilter corresponding to the second prefilter decoded from the bitstream or the second postfilter decoded from the bitstream to the second region of the first image, and outputs the second image.

According to the twelfth aspect, an appropriate postfilter can be applied to each of the plurality of regions in the first image.

In an image decoder according to a thirteenth aspect of the present disclosure, in the twelfth aspect, the circuitry may select, from a plurality of postfilter sets including a postfilter set acquired from the bitstream, the postfilter set including the first postfilter and the second postfilter, based on usage information indicating image usage of the second image.

According to the thirteenth aspect, the postfilter to be applied to the first image can be changed in accordance with the image usage.

In an image decoder according a fourteenth aspect of the present disclosure, in the thirteenth aspect, the image usage may include at least one machine task and human vision.

According to the fourteenth aspect, it is possible to not only select the postfilter suitable for the machine task but also select the postfilter suitable for human vision.

In an image decoder according to a fifteenth aspect of the present disclosure, in any one of the twelfth to fourteenth aspects, the first parameter and the second parameter each may include at least one of a quantization parameter, a partitioning size, a prediction type, and a bounding box.

According to the fifteenth aspect, not only an appropriate postfilter can be applied to each of the plurality of regions in the first image, but also appropriate decoding processing can be executed.

In an image decoder according to a sixteenth aspect of the present disclosure, in the fifteenth aspect, the first parameter and the second parameter each may include the quantization parameter, and the circuitry may apply the first postfilter or the second postfilter based on a value of the quantization parameter or a parity of the quantization parameter.

According to the sixteenth aspect, the postfilters to be applied to the first region and the second region of the first image can be easily set using the quantization parameter.

In an image decoder according to a seventeenth aspect of the present disclosure, in the fifteenth aspect, the first parameter and second parameter each may include the partitioning size, and the circuitry may apply the first postfilter or the second postfilter based on a total number of pixels of the partitioning size, an aspect ratio of the partitioning size, or a number of horizontal pixels and a number of vertical pixels of the partitioning size.

According to the seventeenth aspect, the postfilters to be applied to the first region and the second region of the first image can be easily set using the partitioning size.

In an image decoder according an eighteenth aspect of the present disclosure, in the fifteenth aspect, the first parameter and the second parameter each may include the prediction type, and the circuitry may apply the first postfilter or the second postfilter based on whether the prediction type is an intra prediction or an inter prediction.

According to the eighteenth aspect, the postfilters to be applied to the first region and the second region of the first image can be easily set using the prediction type.

In an image decoder according to a nineteenth aspect of the present disclosure, in the fifteenth aspect, the first parameter and the second parameter each may include the bounding box, and the circuitry may apply the first postfilter or the second postfilter based on whether to be a region within the bounding box or a region outside the bounding box.

According to the nineteenth aspect, the postfilters to be applied to the first region and the second region of the first image can be easily set using the bounding box.

In an image decoder according to a twentieth aspect of the present disclosure, in any one of the twelfth to nineteenth aspects, the circuitry may extract filter information from a header of the bitstream, the filter information relating to the first prefilter or the first postfilter and the second prefilter or the second postfilter.

According to the twentieth aspect, by storing the filter information in the header of the bitstream, the filter information can be easily decoded from the bitstream.

In an image decoder according to a twenty-first aspect of the present disclosure, in the twentieth aspect, the filter information may include usage information indicating image usage at the image decoder side, the image usage being that of when the filter information is generated in the image encoder.

According to the twenty-first aspect, the postfilter to be applied to the first image can be changed in accordance with the image usage.

In an image decoder according to a twenty-second aspect of the present disclosure, in the twentieth aspect, the header may include a supplemental enhancement information (SEI) region, and the circuitry may extract the filter information from the SEI region.

According to the twenty-second aspect, the filter information can be easily handled as additional information by storing the filter information in the SEI region.

An image encoding method according to a twenty-third aspect of the present disclosure, the method including: by an image encoder, determining a first region and a second region in an input image, generating a first image from the input image by applying a first prefilter to the first region and applying a second prefilter to the second region, determining a first parameter relating to the first region and a second parameter relating to the second region, and generating a bitstream by encoding the first region based on the first parameter, encoding the second region based on the second parameter, encoding the first prefilter or a first postfilter corresponding to the first prefilter, and encoding the second prefilter or a second postfilter corresponding to the second prefilter.

According to the twenty-third aspect, an appropriate prefilter can be applied to each of the plurality of regions in the input image.

An image decoding method according to a twenty-fourth aspect of the present disclosure, the method including: by an image decoder, decoding a first prefilter or a first postfilter corresponding to the first prefilter, a second prefilter or a second postfilter corresponding to the second prefilter, a first parameter, and a second parameter from a bitstream, decoding a first region of a first image from the bitstream based on the first parameter, and decoding a second region of the first image from the bitstream based on the second parameter, generating a second image by applying a first postfilter corresponding to the first prefilter decoded from the bitstream or the first postfilter decoded from the bitstream to the first region of the first image, and applying a second postfilter corresponding to the second prefilter decoded from the bitstream or the second postfilter decoded from the bitstream to the second region of the first image, and outputting the second image.

According to the twenty-fourth aspect, an appropriate postfilter can be applied to each of the plurality of regions in the first image.

Embodiments of Present Disclosure

Embodiments of the present disclosure will be described below in detail with reference to the drawings. Elements denoted by the same corresponding reference signs in different drawings represent the same or corresponding elements.

Embodiments to be described below will each refer to a specific example of the present disclosure. The numerical values, shapes, constituent elements, steps, orders of the steps, and the like of the following embodiments are merely examples, and do not intend to limit the present disclosure. A constituent element not described in an independent claim representing the highest concept among constituent elements in the embodiments below is described as a discretionary constituent element. In all embodiments, respective items of content can be combined.

FIG. 1 is a diagram illustrating a simplified configuration of an image processing system according to an embodiment of the present disclosure. The image processing system includes an image encoder 10, a network Nw, and an image decoder 20.

The image encoder 10 includes a region setting unit 11, a prefilter processing unit 12, a parameter setting unit 13, a conversion unit 14, and an encoding processing unit 15.

Image data D1 of an input image is input to the region setting unit 11. The input image includes a video, still image, or feature quantity. The region setting unit 11 sets a plurality of regions in the input image in accordance with image characteristics such as importance in a machine task. The plurality of regions includes a region of interest (ROI) having high importance, such as an object in the input image, and a region of non-interest (RONI) having low importance, such as a background in the input image. The region of interest is an example of a first region, and the region of non-interest is an example of a second region. The region setting unit 11 inputs the image data D1 and region setting information D2 to the prefilter processing unit 12. The plurality of regions may be set using, for example, a neural network. Further, the plurality of regions may be set differently In accordance with a target machine task.

The prefilter processing unit 12 includes a plurality of prefilter sets of different types in accordance with the image usage on the image decoder 20 side. The image usage is designated by a user, for example. The prefilter processing unit 12 selects one prefilter set from among the plurality of prefilter sets based on usage information D20 indicating image usage on the image decoder 20 side. As a result, the prefilter to be applied to the input image can be changed in accordance with the image usage. The plurality of prefilter sets includes a prefilter set for object detection, a prefilter set for object tracking, a prefilter set for human vision, and the like. Further, the selected one prefilter set includes a plurality of prefilters. The plurality of prefilters includes a first prefilter applied to the first region and a second prefilter applied to the second region. Three or more prefilters may be included. The prefilter processing unit 12 generates, based on the setting information D2, a first image from the input image by applying the first prefilter to the first region of the input image and applying the second prefilter to the second region of the input image. As a result, an appropriate prefilter can be applied to each of the plurality of regions in the input image. The prefilter processing unit 12 inputs the setting information D2 and image data D3 of the first image generated by executing the prefilter processing to the parameter setting unit 13. Further, the prefilter processing unit 12 inputs, to the conversion unit 14, filter information D4 about the plurality of prefilters applied to the input image. The filter information D4 includes information indicating the first prefilter and the second prefilter.

The parameter setting unit 13 sets a plurality of parameters relating to the plurality of regions including the first region and the second region in the first image based on the setting information D2 and the image data D3. The plurality of parameters includes at least one of a quantization parameter, a partitioning size, a prediction type, and a bounding box. The plurality of parameters includes a first parameter relating to the first region and a second parameter relating to the second region. The parameter setting unit 13 inputs the image data D3 and parameter setting information D6 to the encoding processing unit 15. This makes it possible not only to apply an appropriate prefilter to each region of the plurality of regions in the input image, but also to execute appropriate encoding processing.

The conversion unit 14 converts the plurality of prefilters indicated by the filter information D4 into a plurality of postfilters complementary thereto. According to such a configuration, since the conversion processing from the prefilter to the postfilter is executed on the image encoder 10 side, the processing load on the image decoder 20 can be reduced. The conversion unit 14 inputs filter information D5 relating to a plurality of postfilters obtained by converting a plurality of prefilters to the encoding processing unit 15. The filter information D5 includes information indicating a first postfilter obtained by converting the first prefilter and information indicating a second postfilter obtained by converting the second prefilter. Note that the conversion processing from the prefilter to the postfilter may be executed on the image decoder 20 side by mounting the conversion unit 14 not on the image encoder 10 but on the image decoder 20. In this case, the filter information D5 includes information indicating the first prefilter and information indicating the second prefilter. According to such a configuration, since the conversion processing from the prefilter to the postfilter is executed on the image decoder 20 side, the processing load on the image encoder 10 can be reduced. Note that the filter information D5 may include the usage information D20 used when the prefilter processing unit 12 selects one prefilter set from the plurality of prefilter sets.

The encoding processing unit 15 generates a bitstream D7 by encoding the image data D3 based on the setting information D6 and encoding the filter information D5. The encoding processing unit 15 transmits the generated bitstream D7 to the image decoder 20 via the network Nw. Specifically, the encoding processing unit 15 encodes the first region of the first image based on the first parameter, and encodes the second region of the first image based on the second parameter. Further, the encoding processing unit 15 encodes the plurality of postfilters indicated by the filter information D5.

Note that, in a case where the conversion processing from the prefilter to the postfilter is executed on the image decoder 20 side, the encoding processing unit 15 encodes the plurality of prefilters indicated by the filter information D4.

The network Nw is the Internet, a wide area network (WAN), a local area network (LAN), or a discretionary combination thereof. The network Nw needs not necessarily be limited to a bidirectional communication network, but may be a unidirectional communication network that transmits broadcast waves such as terrestrial digital broadcasting or satellite broadcasting. The network Nw may be a recording medium such as a digital versatile disc (DVD) or a Blu-ray disc (BD) on which the bitstream D7 is recorded.

The image decoder 20 includes a decoding processing unit 21, a postfilter processing unit 22, and a task processing unit 23.

The decoding processing unit 21 receives the bitstream D7 from the image encoder 10 via the network Nw and decodes the bitstream D7. Specifically, the decoding processing unit 21 decodes filter information D9 corresponding to the filter information D5 and setting information D10 corresponding to the setting information D6 from the bitstream D7 received from image encoder 10. The filter information D9 includes information indicating a first postfilter obtained by converting the first prefilter and information indicating a second postfilter obtained by converting the second prefilter. The setting information D10 includes a first parameter relating to the first region of the decoded image and a second parameter relating to the second region. The decoded image corresponds to the first image. Further, the decoding processing unit 21 decodes the first region of the decoded image from the bitstream D7 based on the first parameter, and decodes the second region of the decoded image from the bitstream D7 based on the second parameter. The decoding processing unit 21 inputs the image data D8 of the decoded image, the filter information D9, and the setting information D10 to the postfilter processing unit 22.

The postfilter processing unit 22 includes a plurality of postfilter sets of different types in accordance with the image usage. The image usage is designated by a user, for example. The postfilter processing unit 22 selects one postfilter set from among the plurality of postfilter sets based on the usage information D20 indicating image usage. As a result, the postfilter to be applied to the decoded image can be changed in accordance with the image usage. The one postfilter set includes a plurality of postfilters. The plurality of postfilters includes a first postfilter applied to the first region of the decoded image and a second postfilter applied to the second region of the decoded image. The postfilter processing unit 22 generates the second image from the decoded image by applying the first postfilter to the first region of the decoded image and applying the second postfilter to the second region of the decoded image. As a result, an appropriate postfilter can be applied to each of the plurality of regions in the decoded image. The postfilter processing unit 22 inputs, to the task processing unit 23, the image data D11 of the second image generated by the execution of the postfilter processing.

Note that, in a case where the conversion unit 14 is implemented in the image decoder 20, the decoding processing unit 21 decodes the plurality of prefilters from the bitstream D7, the conversion unit 14 converts the plurality of prefilters to the plurality of postfilters, and the postfilter processing unit 22 applies the plurality of postfilters to the decoded image.

Further, one of the plurality of postfilters may be a bypass filter that bypasses the postfilter processing. By selecting the bypass filter, it is possible to avoid unnecessary filter processing from being executed. Here, for example, the bypass filter may be indicated by setting all the values of the filter coefficients to 0, or the bypass filter may be indicated by using another information without using the filter coefficients. Note that when there is no filter set corresponding to the image usage indicated by the usage information D20 among the plurality of postfilter sets included in the postfilter processing unit 22, the filter processing may be bypassed.

By using the second image indicated by the image data D11, the task processing unit 23 executes task processing in accordance with the usage information D20 indicating the image usage, and outputs result data D12 such as an inference result.

Figure 2:
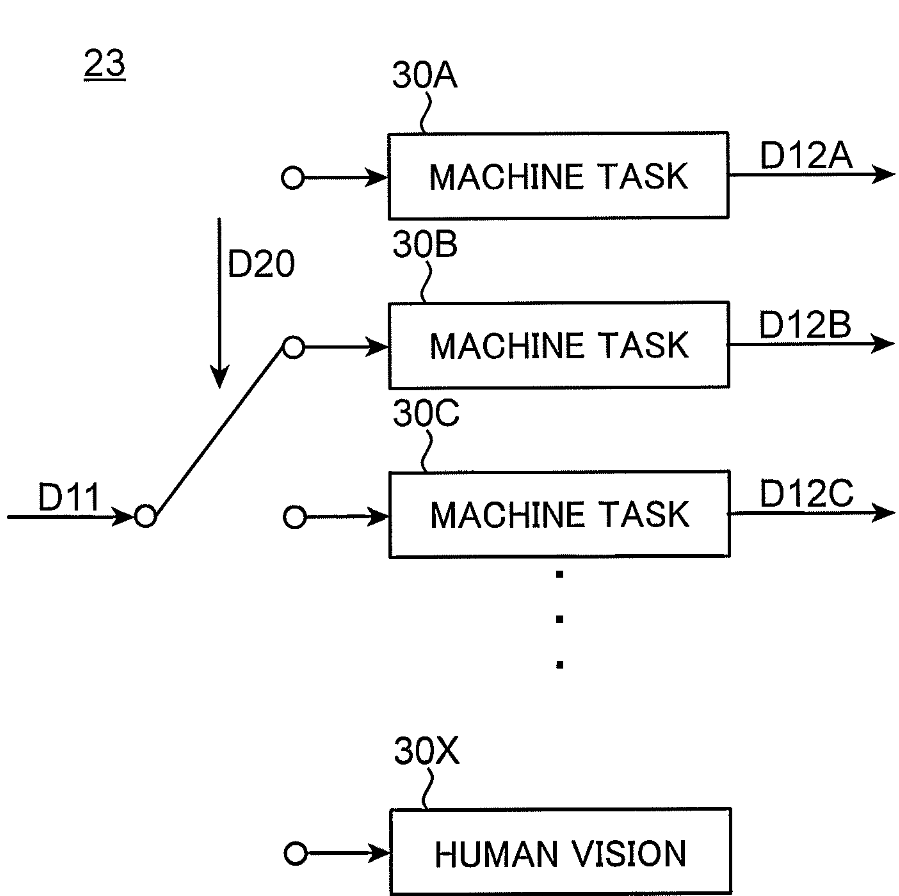
FIG. 2 is a diagram illustrating a simplified configuration of a task processing unit.

FIG. 2 is a diagram illustrating a simplified configuration of the task processing unit 23. The image usage on the image decoder 20 side includes at least one machine task and human vision. This makes it possible to not only select the prefilter suitable for the machine task but also select the prefilter suitable for human vision. In the example of FIG. 2, the image usage includes a plurality of machine tasks 30A to 30C and human vision 30X. When the usage information D20 selects, for example, the machine task 30B, the task processing unit 23 executes the machine task 30B based on the image data D11 and outputs result data D12B such as an inference result. By including human vision in the image usage, the postfilter processing unit 22 can not only select the postfilter suitable for the machine task but also select the postfilter set suitable for the human vision.

FIG. 3 is a diagram illustrating object detection and object segmentation as examples of the machine task. In object detection, the attribute of the object (television and person in this example) included in the input image is detected. In addition to the attribute of the object included in the input image, the position and the number of objects in the input image may be detected. By the object detection, for example, the position of the object of a recognition target may be narrowed down, or objects other than the object of the recognition target may be excluded. As a specific use, for example, detection of a face in a camera and detection of a pedestrian or the like in autonomous driving can be considered. In object segmentation, pixels in a region corresponding to the object are segmented (i.e., partitioned). By the object segmentation, for example, usage such as separating obstacles and roads in autonomous driving to provide assistance to safe traveling of an automobile, detecting product defects in a factory, and identifying terrain in a satellite image can be considered.

FIG. 4 is a diagram illustrating object tracking, action recognition, and pose estimation as examples of the machine task. In object tracking, the movement of an object assigned with an identification number ID is tracked. As a use, for example, counting the number of users in a shop or other facilities and analyzing motion of an athlete can be considered. Faster processing will enable real-time object tracking and application to camera processing such as autofocus. In action recognition, the type of action of the object (in this example, “riding a bicycle” and “walking”) is detected. For example, by the use for a security camera, application to prevention and detection of criminal behavior such as robbery and shoplifting, and prevention of forgetting work in a factory is possible. In pose estimation, the posture of the object is detected by detection of a key point and a joint. For example, utilization in an industrial field such as improvement of work efficiency in a factory, a security field such as detection of abnormal behavior, and healthcare and sports fields can be considered.

Based on the setting information D2, the prefilter processing unit 12 selects the first prefilter and the second prefilter from the prefilter set including a plurality of prefilters of different types. The type includes at least one of the shape, size, and coefficient value of the filter.

The prefilters corresponding to the machine tasks include at least one of a noise removal filter, a sharpening filter, a bit depth conversion filter, a color space conversion filter, a resolution conversion filter, and a filter using a neural network. The noise removal filter includes at least one of a low-pass filter, a Gaussian filter, a smoothing filter, an averaging filter, a bilateral filter, and a median filter to remove noise by reducing information on details of the input image. The sharpening filter includes an edge detection filter or an edge enhancement filter, specifically includes a Laplacian filter, a Gaussian-Laplacian filter, a Sobel filter, a Prewitt filter, or a Canny edge detection filter. The bit depth conversion filter converts bit depth of a luminance signal and/or a color signal between the input image and the first image. For example, by truncating lower bits of the color signal of the first image and converting the bit depth of the first image to be smaller than the bit depth of the input image, a code amount is reduced. The color space conversion filter converts the color space between the input image and the first image. For example, by converting a color space of YUV444 in the input image to YUV422, YUV420, or YUV400 in the first image, the code amount is reduced. The resolution conversion filter converts the image resolution between the input image and the first image. The resolution conversion filter includes a downsampling filter that reduces the resolution of the first image as compared with the resolution of the input image. The resolution conversion filter may include an upsampling filter that increases the resolution of the first image as compared with the resolution of the input image. The first filter corresponding to the machine task may be, for example, a deblocking filter, an adaptive loop filter (ALF), a cross component adaptive loop filter (CCALF), a sample adaptive offset filter (SAO), a luma mapping with chroma scaling filter (LMCS), which are defined in H.266/Versatile Video Codec (VVC), or a discretionary combination thereof.

The prefilter corresponding to the human vision is a filter that does not reduce the code amount of the first image compared with the code amount of the input image by filter processing. The prefilter corresponding to the human vision includes a bypass filter that outputs the input image as it is as the first image. The prefilter corresponding to human vision may be a filter that reduces the code amount of the first image as compared with the code amount of the input image by filter processing, but the reduction effect of the code amount is suppressed more than that of the prefilter corresponding to the machine task. Further, the prefilter corresponding to human vision may be a filter that enhances an important region of the input image, but the enhancement effect is suppressed more than that of the prefilter corresponding to the machine task.

Figures 5A, 5B, 5C:
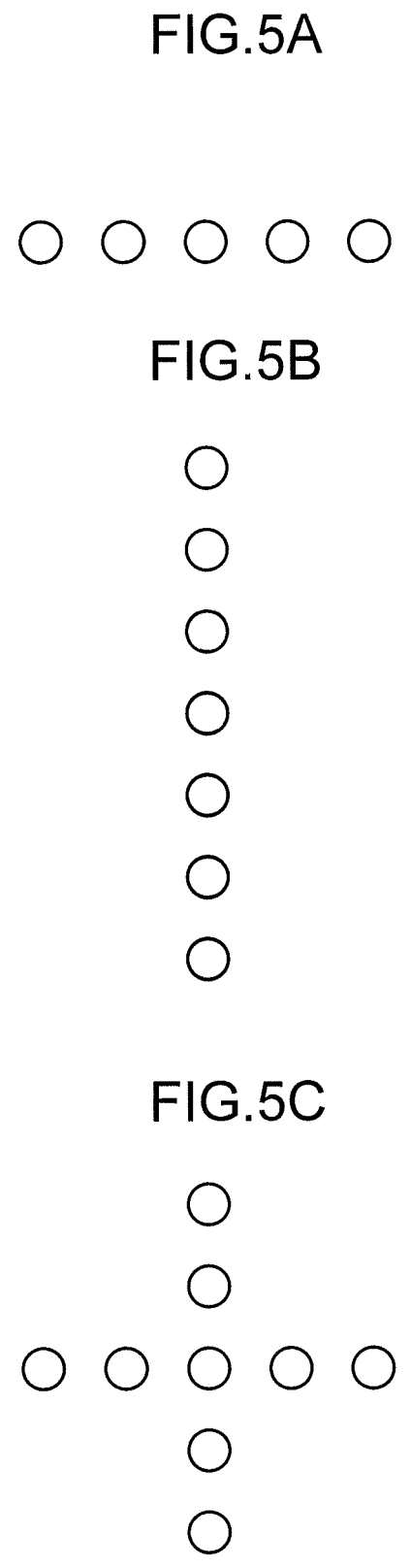
Figure 5D:
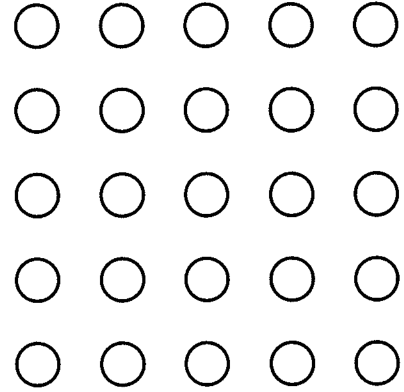
FIG. 5D is a diagram illustrating an example of the plurality of prefilters of different types.
Figure 5E:
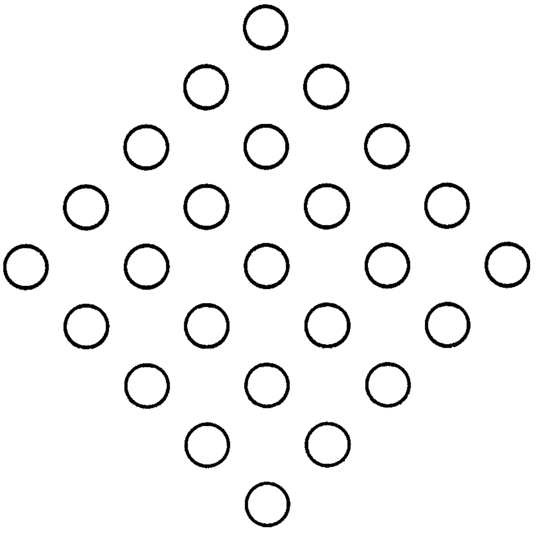
FIG. 5E is a diagram illustrating an example of the plurality of prefilters of different types.
Figures 5H, 5I:
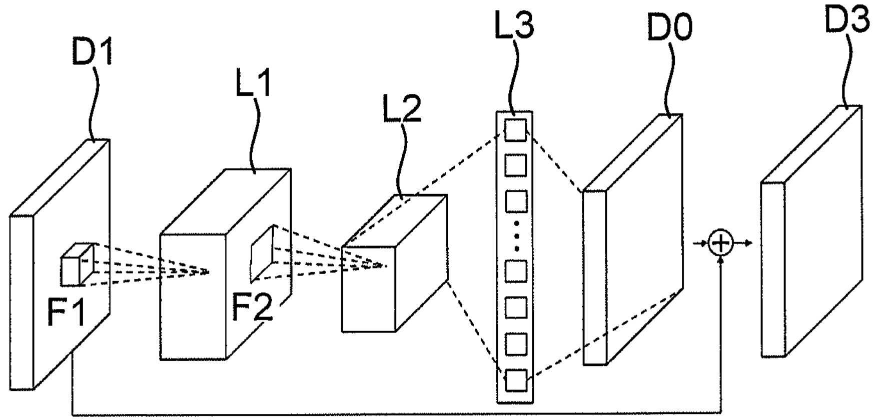
FIG. 5H is a diagram illustrating an example of the plurality of prefilters of different types.
FIG. 5I is a diagram illustrating an example of the plurality of prefilters of different types.

FIGS. 5A to 5I are diagrams illustrating examples of the plurality of prefilters of different types. FIG. 5A illustrates a one-dimensional horizontal filter with N=5. N is the size of the filter corresponding to the number of filter coefficient values. FIG. 5B illustrates a one-dimensional vertical filter with N=7. FIG. 5C illustrates a two-dimensional cross-shaped filter with N=9. FIG. 5D illustrates a two-dimensional square filter with N=25. FIG. 5E illustrates a two-dimensional rhombic filter with N=25. FIGS. 5F and 5G illustrate a noise removal filter using a 5×5 Gaussian filter. The filter of FIG. 5F has a relatively strong filter strength, and the filter of FIG. 5G has a relatively weak filter strength. FIG. 5H illustrates an edge detection filter using a 7×7 Gaussian-Laplacian filter. As described above, the plurality of prefilters of different types may have different filter shapes, different filter sizes, or different filter coefficient values. FIG. 5I illustrates the prefilter using a neural network. The neural network has a convolution layer L1, a pooling layer L2, and a fully coupled layer L3. The image data of the convolution layer L1 is generated by applying a convolution filter F1 to the image data D1 of the input image, and the image data of the pooling layer L2 is generated by applying a pooling filter F2 to the image data of the convolution layer L1. Image data D0 of a predicted residual error is output from the fully coupled layer L3, and the image data D1 and the image data D0 are added to output the image data D3 of the first image.

FIG. 6 is a diagram illustrating an example of a lookup table that defines selection of the prefilter set based on image usage. The lookup table is held by the prefilter processing unit 12. When the image usage is a machine task of object detection, detailed information about the object is important, and therefore the prefilter processing unit 12 selects a weak noise removal filter and a weak sharpening filter. When the image usage is a machine task of object segmentation, details of the image are important in an object segmentation model (Mask R-CNN) that performs pixel-level prediction, and therefore, the prefilter processing unit 12 selects a weak noise removal filter. When the image usage is a machine task of object tracking, detailed information about the object is not important, and therefore, the prefilter processing unit 12 selects a strong noise removal filter and a weak sharpening filter. When the image usage is a machine task of action recognition, the prefilter processing unit 12 selects a strong noise removal filter and a strong sharpening filter in order to enhance dynamic content such as an edge of the object while removing redundant information about static content such as a background. When the image usage is a machine task of pose estimation, a pose estimation model (HRNet) learns a high-resolution image in order to detect key points of a human such as an ear or an eye, and therefore the prefilter processing unit 12 enhances details of the image by selecting a strong sharpening filter.

As described above, based on the setting information D2, the prefilter processing unit 12 selects the first prefilter and the second prefilter from the prefilter set including the plurality of prefilters. The first prefilter and the second prefilter may be two or more filters having different filter strengths. FIG. 7A is a diagram illustrating an example of a sharpening filter having a strong filter strength, and the filter strength is 9. FIG. 7B is a diagram illustrating an example of a sharpening filter having a weak filter strength, and the filter strength is 5.

For example, when a region with high importance in the machine task is the first region, the first prefilter may be a sharpening filter with a high filter strength, and when a region with low importance in the machine task is the second region, the second prefilter may be a sharpening filter with a low filter strength. Further, for example, when a region with high importance in the machine task is the first region, the first prefilter may be a smoothing filter with a low filter strength, and when a region with low importance in the machine task is the second region, the second prefilter may be a smoothing filter with a high filter strength.

Figures 8A, 8B:
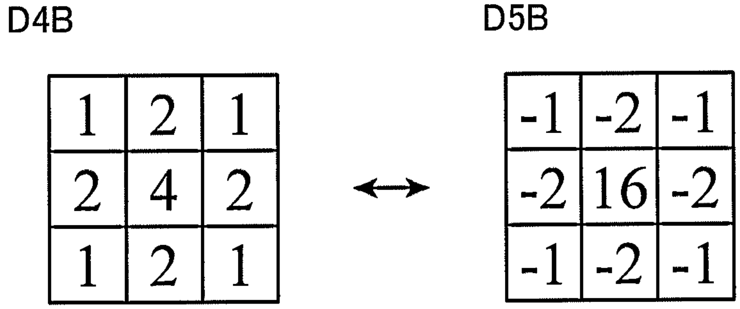
FIG. 8A is a diagram illustrating an example of filter conversion processing by a conversion unit.
FIG. 8B is a diagram illustrating an example of the filter conversion processing by the conversion unit.

FIG. 8A is a diagram illustrating an example of the filter conversion processing by the conversion unit 14. The conversion unit 14 converts a prefilter using a noise removal filter D4A having filter strength of ½ into a postfilter using a sharpening filter D5A having filter strength of 2. Alternatively, the conversion unit 14 converts a prefilter using the sharpening filter D5A having filter strength of 2 into a postfilter using the noise removal filter D4A having filter strength of ½.

FIG. 8B is a diagram illustrating an example of the filter conversion processing by the conversion unit 14. The conversion unit 14 converts a prefilter using a noise removal filter D4B having filter strength of ¼ into a postfilter using a sharpening filter D5B having filter strength of 4. Alternatively, the conversion unit 14 converts a prefilter using the sharpening filter D5B having filter strength of 4 into a postfilter using the noise removal filter D4B having filter strength of ¼.

FIG. 9A is a diagram illustrating a first configuration example of the encoding processing unit 15 in a simplified manner. The encoding processing unit 15 includes a dividing unit 41, a subtractor 42, a conversion unit 43, a quantization unit 44, an entropy encoding unit 45, an inverse quantization unit 46, an inverse conversion unit 47, an adder 48, an inter prediction unit 49, an intra prediction unit 50, and a changeover switch 51. In the first configuration example illustrated in FIG. 9A, the parameter setting unit 13 sets a plurality of quantization parameters as the plurality of parameters, and setting information D6A about the quantization parameter is input from the parameter setting unit 13 to the quantization unit 44. The quantization unit 44 executes quantization processing on each of the first region and the second region of the first image using the quantization parameters set in the setting information D6A. This makes it possible to easily set the quantization parameters to be applied to the first region and the second region of the first image in accordance with the first prefilter or second prefilter applied by the prefilter processing unit 12.

FIG. 9B is a diagram illustrating a second configuration example of the encoding processing unit 15 in a simplified manner. In the second configuration example illustrated in FIG. 9B, the parameter setting unit 13 sets a plurality of partitioning sizes as the plurality of parameters, and setting information D6B about the partitioning sizes is input from the parameter setting unit 13 to the dividing unit 41. The dividing unit 41 executes dividing processing of the partitioning block on each of the first region and the second region of the first image using the partitioning sizes set in the setting information D6B. This makes it possible to easily set the partitioning sizes to be applied to the first region and the second region of the first image in accordance with the first prefilter or second prefilter applied by the prefilter processing unit 12.

FIG. 9C is a diagram illustrating a third configuration example of the encoding processing unit 15 in a simplified manner. In the third configuration example illustrated in FIG. 9C, the parameter setting unit 13 sets a plurality of prediction types as the plurality of parameters, and setting information D6C about the prediction types is input from the parameter setting unit 13 to the changeover switch 51. By switching the changeover switch 51 to the inter prediction unit 49 side or the intra prediction unit 50 side, inter prediction processing or intra prediction processing is executed on each of the first region and the second region of the first image using the prediction types set in the setting information D6C. This makes it possible to easily set the prediction types to be applied to the first region and the second region of the first image in accordance with the first prefilter or second prefilter applied by the prefilter processing unit 12.

FIG. 9D is a diagram illustrating a fourth configuration example of the encoding processing unit 15 in a simplified manner. In the fourth configuration example illustrated in FIG. 9D, the parameter setting unit 13 sets a plurality of bounding boxes as the plurality of parameters, and setting information D6D about the bounding boxes is input from the parameter setting unit 13 to the quantization unit 44. According to the setting information D6D, for example, a region inside the bounding box is set as the first region, and a region outside the bounding box is set as the second region. The quantization unit 44 executes quantization processing using a first quantization parameter for the first region, and executes quantization processing using a second quantization parameter larger than the first quantization parameter for the second region. This makes it possible to easily set the bounding box to be set in the first image in accordance with the first prefilter or second prefilter applied by the prefilter processing unit 12.

Figure 26:
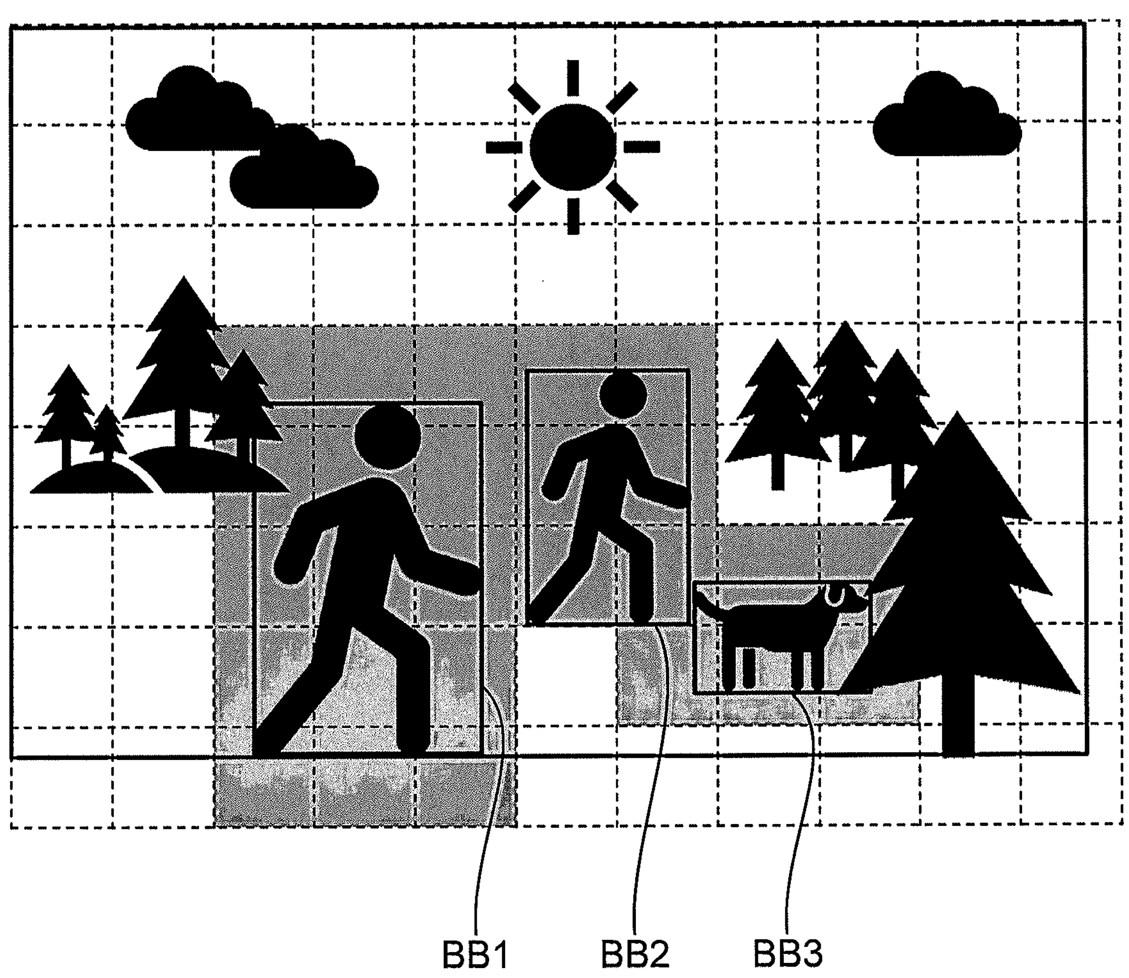
FIG. 26 is a diagram schematically illustrating an example of a first image.

FIG. 26 is a diagram schematically illustrating an example of the first image. A plurality of rectangular regions (rectangular regions partitioned by broken lines) constituting the first image corresponds to a coding unit block such as a coding unit (CU) or a coding tree unit (CTU). The first image has a first region in the bounding boxes BB1 to BB3, the first region having high importance for a machine task such as a person, and a second region outside the bounding boxes BB1 to BB3, the second region having low importance for a machine task such as a background. The quantization unit 44 executes the quantization processing using the first quantization parameter on the coding unit block corresponding to the first region (coding unit block colored in gray) among all the coding unit blocks constituting the first image, and executes the quantization processing using the second quantization parameter larger than the first quantization parameter on the coding unit block corresponding to the second region.

FIG. 9E is a diagram illustrating a fifth configuration example of the encoding processing unit 15 in a simplified manner. In the fifth configuration example illustrated in FIG. 9E, the parameter setting unit 13 sets a plurality of bounding boxes as the plurality of parameters, and setting information D6E about the bounding boxes is input from the parameter setting unit 13 to the entropy encoding unit 45. The entropy encoding unit 45 includes bounding box information in the bitstream D7 by encoding the setting information D6E. This makes it possible to easily set the bounding box to be set in the first image in accordance with the first prefilter or second prefilter applied by the prefilter processing unit 12.

FIG. 10 is a table showing a first example of a parameter setting method relating to the first configuration example illustrated in FIG. 9A. The parameter setting unit 13 holds a lookup table in which a correspondence relationship between the values of the quantization parameters and the filter indexes assigned to the prefilters is described. The parameter setting unit 13 sets the quantization parameter corresponding to the filter index of the first prefilter applied to the first region of the first image as the quantization parameter for the first region. Further, the parameter setting unit 13 sets the quantization parameter corresponding to the filter index of the second prefilter applied to the second region of the first image as the quantization parameter for the second region. For example, in the first image, a smaller quantization parameter is set for a region having higher importance, and a larger quantization parameter is set for a region having lower importance. Note that the quantization parameters may be set in units of blocks corresponding to the respective regions, or may be set in units of images (units of pictures). Note that information for generating the lookup table illustrated in FIG. 10 may be included in the filter information D5.

FIG. 11 is a table showing a second example of the parameter setting method relating to the first configuration example illustrated in FIG. 9A. The parameter setting unit 13 sets a smaller quantization parameter for a region having higher importance in the first image, and sets a larger quantization parameter for a region having lower importance. At that time, the parameter setting unit 13 sets the least significant bit of the quantization parameter corresponding to the filter index of the first prefilter applied to the first region of the first image to an even number, and sets the least significant bit of the quantization parameter corresponding to the filter index of the second prefilter applied to the second region of the first image to an odd number. Note that information for generating the correspondence relationship illustrated in FIG. 11 may be included in the filter information D5.

Figure 12:
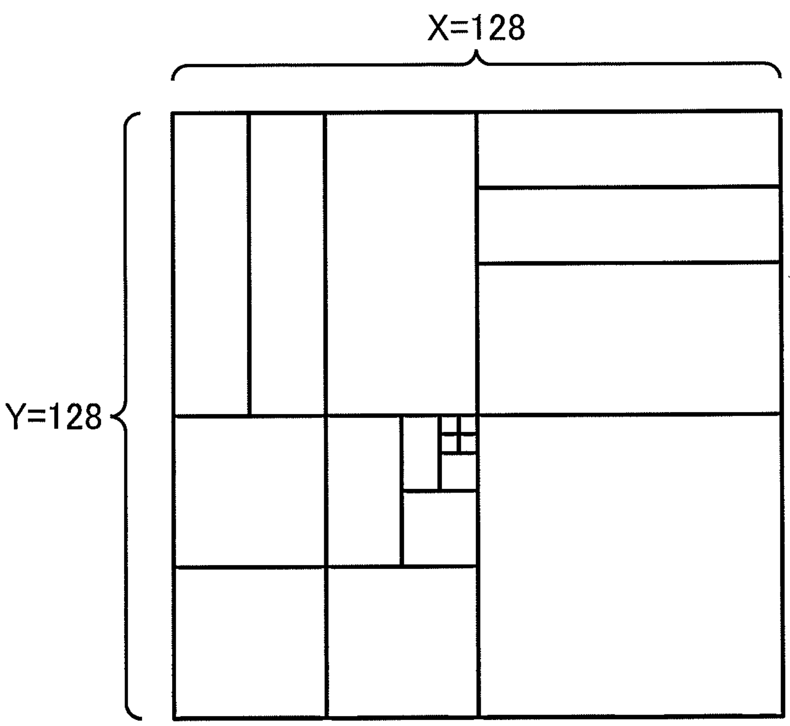
FIG. 12 is a diagram illustrating an example of a partitioning block divided by a dividing unit.

FIG. 12 is a diagram illustrating an example of a partitioning block divided by the dividing unit 41. The dividing unit 41 divides a processing block having 128 horizontal pixels X and 128 vertical pixels Y included in the input image into a plurality of partitioning blocks having various partitioning sizes. The minimum partitioning size is, for example, X=Y=4.

Figure 13:
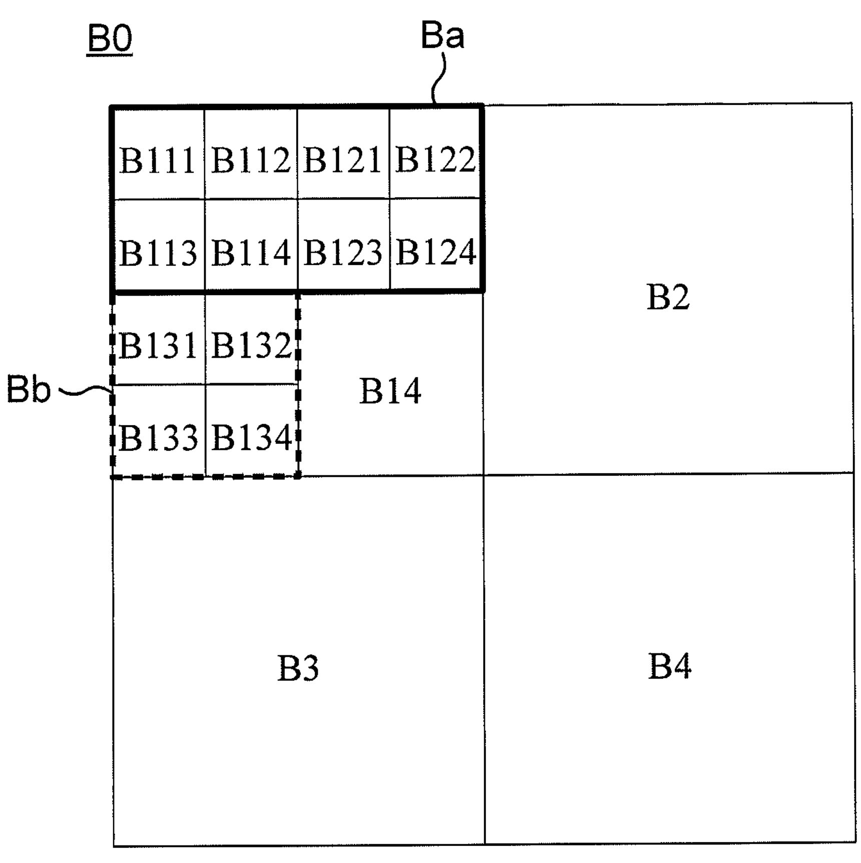
FIG. 13 is a diagram illustrating an example of a method for dividing a processing block with the dividing unit.
Figure 14:
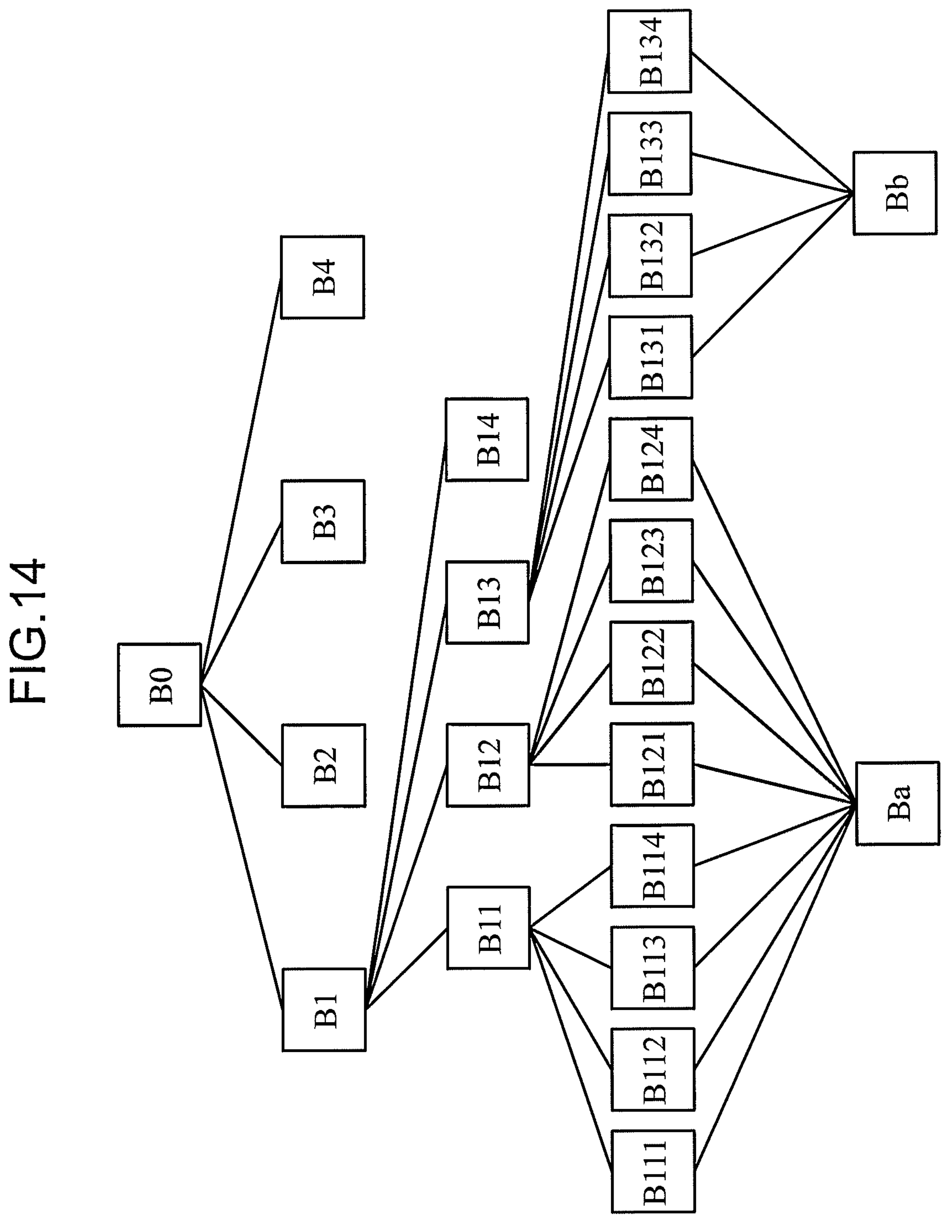
FIG. 14 is a diagram illustrating an example of the method for dividing the processing block with the dividing unit.

FIGS. 13 and 14 are diagrams illustrating examples of a method for dividing a processing block B0 with the dividing unit 41. First, the dividing unit 41 calculates the edge strength of the processing block B0 by applying a Sobel horizontal edge detector and a Sobel vertical edge detector to the processing block B0. In a case where the edge strength of the processing block B0 is equal to or greater than a predetermined threshold, the dividing unit 41 divides the processing block B0 into four equal parts. In the examples of FIGS. 13 and 14, the processing block B0 is divided into sub-blocks B1 to B4. Next, the dividing unit 41 calculates the edge strength of the sub-blocks B1 to B4 by applying a Sobel horizontal edge detector and a Sobel vertical edge detector to each of the sub-blocks B1 to B4. When the edge strength of each of the sub-blocks B1 to B4 is equal to or greater than the threshold, the dividing unit 41 further divides each of the sub-blocks B1 to B4 into four equal parts. In the examples of FIGS. 13 and 14, the sub-block B1 is divided into sub-blocks B11 to B14. Next, the dividing unit 41 calculates the edge strength of each of the sub-blocks B11 to B14 by applying a Sobel horizontal edge detector and a Sobel vertical edge detector to each of the sub-blocks B11 to B14. In a case where the edge strength of the sub-blocks B11 to B14 is equal to or greater than the threshold, the dividing unit 41 further divides each of the sub-blocks B11 to B14 into four equal parts. In the examples of FIGS. 13 and 14, the sub-blocks B11, B12, and B13 are divided into sub-blocks B111 to B114, B121 to B124, and B131 to B134. The dividing unit 41 repeats the similar dividing processing until no sub-block having edge strength equal to or greater than the threshold exists or the sizes of the sub-blocks become the minimum size (X=Y=4).

Next, the dividing unit 41 defines a partitioning block by integrating adjacent sub-blocks having common edge strength characteristics. For example, the dividing unit 41 regards that adjacent sub-blocks having an identical level relationship between the horizontal edge strength and the vertical edge strength have a common edge strength characteristic. In the examples of FIGS. 13 and 14, a partitioning block Ba is defined by integrating the sub-blocks B111 to B114 and B121 to B124, and a partitioning block Bb is defined by integrating the sub-blocks B131 to B134.

FIG. 15 is a table showing a first example of the parameter setting method relating to the second configuration example illustrated in FIG. 9B. The parameter setting unit 13 holds a lookup table in which a correspondence relationship between the total numbers of pixels of the partitioning blocks (X×Y) and the filter indexes assigned to the prefilters is described. The parameter setting unit 13 sets the total number of pixels corresponding to the filter index of the first prefilter applied to the first region of the first image as the total number of pixels of the partitioning block for the first region. Further, the parameter setting unit 13 sets the total number of pixels corresponding to the filter index of the second prefilter applied to the second region of the first image as the total number of pixels of the partitioning block for the second region. For example, in the first image, a smaller total number of pixels is set for a region with higher importance, and a larger total number of pixels is set for a region with lower importance. Note that information for generating the lookup table illustrated in FIG. 15 may be included in the filter information D5.

FIG. 16 is a table showing a second example of the parameter setting method relating to the second configuration example illustrated in FIG. 9B. The parameter setting unit 13 holds a lookup table in which a correspondence relationship between aspect ratios of the partitioning blocks (X/Y) and the filter indexes assigned to the prefilters is described. The parameter setting unit 13 sets an aspect ratio corresponding to the filter index of the first prefilter applied to the first region of the first image as the aspect ratio of the partitioning block for the first region. Further, the parameter setting unit 13 sets an aspect ratio corresponding to the filter index of the second prefilter applied to the second region of the first image as the aspect ratio of the partitioning block for the second region. For example, in the first image, a larger aspect ratio is set for a region having higher importance in the horizontal direction and lower importance in the vertical direction, a smaller aspect ratio is set for a region having higher importance in the vertical direction and lower importance in the horizontal direction, and an aspect ratio closer to "1" is set for a region having importance in the horizontal direction and importance in the vertical direction which are closer to each other. Note that information for generating the lookup table illustrated in FIG. 16 may be included in the filter information D5.

FIG. 17 is a table showing a third example of the parameter setting method relating to the second configuration example illustrated in FIG. 9B. The parameter setting unit 13 holds a lookup table in which a correspondence relationship between numbers of horizontal pixels (X) and vertical pixels (Y) of the partitioning block and the filter indexes assigned to the prefilters is described. The parameter setting unit 13 sets the numbers of horizontal pixels and vertical pixels corresponding to the filter index of the first prefilter applied to the first region of the first image as the numbers of horizontal pixels and vertical pixels of the partitioning block for the first region. Further, the parameter setting unit 13 sets the numbers of horizontal pixels and vertical pixels corresponding to the filter index of the second prefilter applied to the second region of the first image as the numbers of horizontal pixels and vertical pixels of the partitioning block for the second region. For example, in the first image, smaller numbers of horizontal pixels and vertical pixels are set for a region with higher importance, and larger numbers of horizontal pixels and vertical pixels are set for a region with lower importance. Note that information for generating the lookup table illustrated in FIG. 17 may be included in the filter information D5.

FIG. 18 is a table showing an example of the parameter setting method relating to the third configuration example illustrated in FIG. 9C. The parameter setting unit 13 sets, in the first image, the prediction type to intra prediction for a region to which a prefilter with filter index "0" is applied, and sets the prediction type to inter prediction for a region to which a prefilter with filter index "1" is applied. For example, as for a region with high importance, a prefilter with filter index "0" is applied, and the prediction type is set to intra prediction. Further, as for a region with low importance, a prefilter with filter index "1" is applied, and the prediction type is set to inter prediction. Note that information for generating the correspondence relationship illustrated in FIG. 18 may be included in the filter information D5.

FIG. 19 is a table showing an example of the parameter setting method relating to the fourth configuration example illustrated in FIG. 9D and the fifth configuration example illustrated in FIG. 9E. The parameter setting unit 13 sets a bounding box so that a region of the first image to which the prefilter with filter index "0" is applied is within the bounding box, and a region of the first image to which the prefilter with filter index "1" is applied is outside the bounding box. Further, regarding the fourth configuration example illustrated in FIG. 9D, the parameter setting unit 13 sets the first quantization parameter for a region of the first image to which the prefilter with filter index "0" is applied, and sets the second quantization parameter larger than the first quantization parameter for a region of the first image to which the prefilter with filter index "1" is applied. Note that information for generating the correspondence relationship illustrated in FIG. 19 may be included in the filter information D5.

The bounding box is information for designating a specific rectangular region in a screen by coordinate information, and for example, may be expressed as horizontal and vertical coordinate values at the upper left of the rectangular region and horizontal and vertical coordinate values at the lower right of the rectangular region, may be expressed as horizontal and vertical coordinate values at the upper left of the rectangular region and horizontal and vertical lengths of the rectangular region, or may be expressed as horizontal and vertical coordinate values at the center of the rectangular region and horizontal and vertical lengths of the rectangular region. In addition, the bounding box may have an index in which a plurality of values can be set in accordance with the type of a target region. In that case, the filter index described with reference to FIG. 19 is not limited to "0" and "1", and other values may be associated in accordance with the index that can be set in the bounding box. Note that information for designating the bounding box may be included in the filter information D5.

Figure 20A:
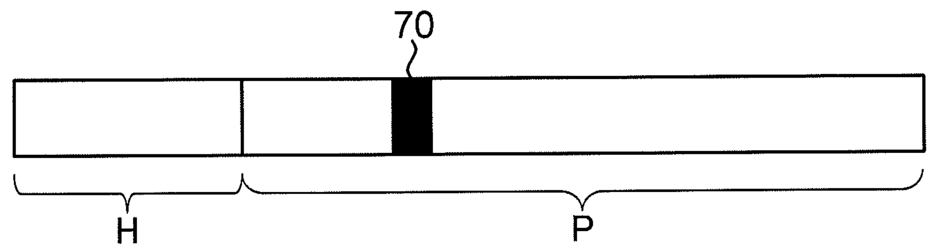
FIG. 20A is a diagram illustrating an example of a data structure of a bitstream.

FIG. 20A is a diagram illustrating a first example of the data structure of the bitstream D7. The bitstream D7 includes a header H in which management information or the like is stored and a payload P in which image data is stored. The encoding processing unit 15 stores encoded data 70 of the filter information D5 into a predetermined location of the payload P.

Figure 20B:
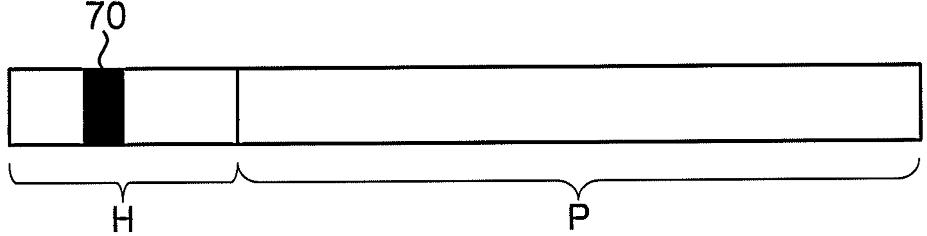
FIG. 20B is a diagram illustrating an example of the data structure of the bitstream.

FIG. 20B is a diagram illustrating a second example of the data structure of the bitstream D7. Similarly to FIG. 20A, the bitstream D7 includes the header H and the payload P. The encoding processing unit 15 stores the encoded data 70 of the filter information D5 into a predetermined location of the header H. The predetermined location is, for example, a supplemental enhancement information (SEI) region for storing additional information. The predetermined location may be VPS, SPS, PPS, PH, SH, APS, a tile header, or the like. By storing the filter information D5 in the header H of the bitstream D7, the decoding processing unit 21 can easily acquire the filter information D5. By storing the filter information D5 in the SEI region, the filter information D5 can be easily handled as additional information. Note that the information for designating the bounding box may be stored in an SEI region (for example, an annotated region SEI) different from a region where other information of the filter information D5 is stored.

FIG. 21 is a diagram illustrating a first example of SEI message syntax relating to the filter information D5.

prefilter_type_idc designates, for example, the type of filter by using three-bit flag information. For example, prefilter_type_idc represents the noise removal filter when the value is "0", represents the sharpening filter when the value is "1", represents the bit depth conversion filter when the value is "2", represents the color space conversion filter when the value is "3", represents the resolution conversion filter when the value is "4", and represents other filters when the value is "5".

filter_strength_level_idc designates, for example, the filter strength by using three-bit flag information. filter_strength_level_idc represents the weakest filter strength when the value is "0", and represents stronger filter strength as the value increases. The maximum value of the filter strength is "7" or any integer.

input_bit_depth_minus8 designates, for example, the bit depth of the input image before applying filter processing using three-bit flag information. The bit depth of the input image is either "8", "10", "12", or any integer.

input_color_format_idc designates, for example, the color space of the input image before applying filter processing using three-bit flag information. The color space that can be designated is monochrome, YUV444, YUV422, YUV420, YUV400, or any color space.

scale_factor designates the ratio between the resolution of the input image and the resolution of the first image. For example, when the resolution of the input image is 1920×1080 and the resolution of the first image is 960×540, the resolution in both vertical and horizontal directions becomes ½. Therefore, scale_factor_nominator is "1" and scale_factor_denominator is "2". scale_factor_nominator and scale_factor_denominator are each, for example, three-bit flag information, and can designate any integer.

FIG. 22 is a diagram illustrating a second example of the SEI message syntax relating to the filter information D5.

prefilter_hint_size_y designates the filter coefficient or the vertical size of correlation array, and is any integer between "1" to "15", for example.

prefilter_hint_size_x designates the filter coefficient or the horizontal size of correlation array, and is any integer between "1" and "15", for example.

prefilter_hint_type designates, for example, the type of filter by using two-bit flag information. For example, prefilter_hint_type represents a two-dimensional finite impulse response (FIR) filter when the value is "0", represents two one-dimensional FIR filters when the value is "1", and represents a cross-correlation matrix when the value is "2".

prefilter_hint_value designates the filter coefficient or elements of the cross-correlation matrix.

Figure 23:
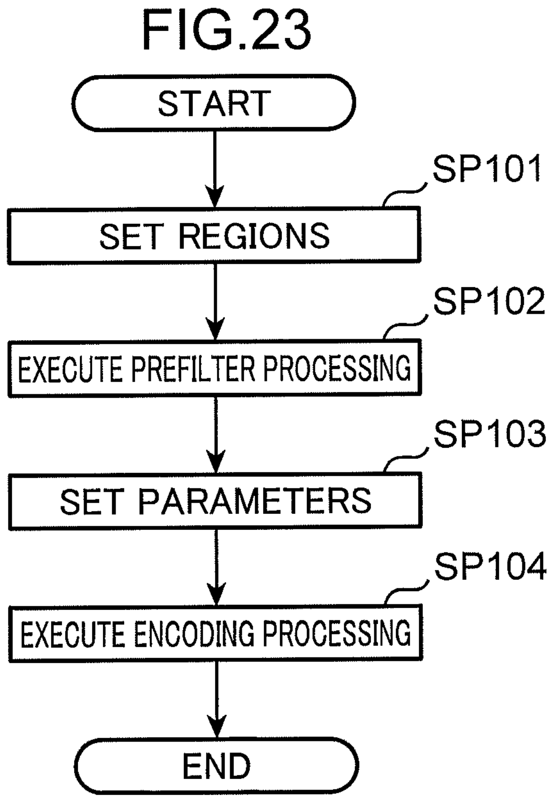
FIG. 23 is a flowchart illustrating a flow of processing executed by an image encoder.

FIG. 23 is a flowchart illustrating a flow of processing executed by the image encoder 10.

The region setting unit 11 first sets, in step SP101, a plurality of regions in the input image in accordance with image characteristics such as importance in a machine task. The plurality of regions includes a first region such as a region of interest and a second region such as a region of non-interest.

The prefilter processing unit 12 generates, in step SP102, a first image from the input image by applying the first prefilter to the first region of the input image and applying the second prefilter to the second region of the input image.

Next, in step SP103, the parameter setting unit 13 sets a first parameter relating to the first region and a second parameter relating to the second region.

In next step SP104, the encoding processing unit 15 encodes the first region of the first image based on the first parameter, and encodes the second region of the first image based on the second parameter. Further, the encoding processing unit 15 encodes the first postfilter and the second postfilter obtained by converting respectively the first prefilter and the second prefilter by the conversion unit 14. The encoding processing unit 15 transmits the generated bitstream D7 generated in the encoding processing to the image decoder 20.

Figure 27:
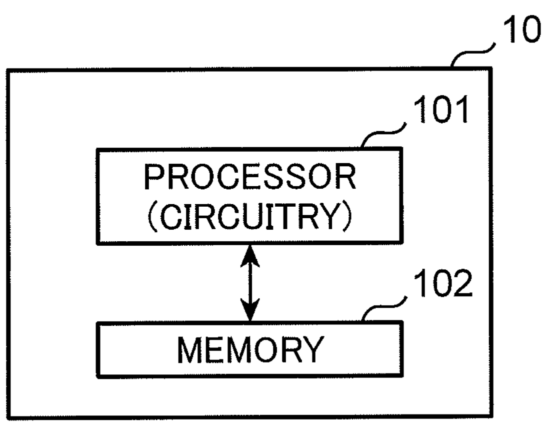
FIG. 27 is a diagram illustrating a simplified implementation example of the image encoder.

FIG. 27 is a diagram illustrating a simplified implementation example of the image encoder 10. The image encoder 10 is configured to include a processor 101 and a memory 102 connected to the processor 101. However, the memory 102 may be included in the processor 101. The processor 101 is circuitry that executes information processing. The processor 101 includes a central processing unit (CPU) or a graphics processing unit (GPU). The memory 102 includes a semiconductor memory such as a read only memory (ROM) or a random access memory (RAM), a magnetic disk, or an optical disk. The memory 102 stores information necessary for the processor 101 to execute prefilter processing, encoding processing, and the like. For example, the memory 102 stores the image data D1 and D3, the setting information D2, and the filter information D4. The memory 102 stores a program. When the processor 101 executes the program read from the memory 102, the processor 101 functions as the region setting unit 11, the prefilter processing unit 12, the parameter setting unit 13, the conversion unit 14, and the encoding processing unit 15.

FIG. 24 is a diagram illustrating a simplified configuration example of the decoding processing unit 21. The decoding processing unit 21 includes an entropy decoding unit 61, an inverse quantization unit 62, an inverse conversion unit 63, an adder 64, a loop filter 65, an inter prediction unit 66, an intra prediction unit 67, and a changeover switch 68.

The entropy decoding unit 61 decodes the filter information D9 corresponding to the filter information D5 and the setting information D10 corresponding to the setting information D6 from the bitstream D7 received from the image encoder 10. As illustrated in FIG. 20A, when the encoded data 70 of the filter information D5 is stored in the payload P of the bitstream D7, the entropy decoding unit 61 extracts the filter information D9 from the payload P of the bitstream D7. As illustrated in FIG. 20B, when the encoded data 70 of the filter information D5 is stored in the header H of the bitstream D7, the entropy decoding unit 61 extracts the filter information D9 from the header H of the bitstream D7. When the encoded data 70 is stored in the SEI region of the header H, the entropy decoding unit 61 extracts the filter information D9 from the SEI region.

The filter information D9 includes information indicating the first postfilter obtained by converting the first prefilter and information indicating the second postfilter obtained by converting the second prefilter. The setting information D10 includes a first parameter relating to the first region of the decoded image and a second parameter relating to the second region. The decoded image corresponds to the first image. Further, the entropy decoding unit 61 decodes the first region of the decoded image from the bitstream D7 based on the first parameter, and decodes the second region of the decoded image from the bitstream D7 based on the second parameter. The decoding processing unit 21 inputs the image data D8 of the decoded image, the filter information D9, and the setting information D10 to the postfilter processing unit 22.

Note that, when the conversion unit 14 is implemented not in the image encoder 10 but in the image decoder 20, the entropy decoding unit 61 decodes the plurality of prefilters from the bitstream D7, the conversion unit 14 converts the plurality of prefilters to the plurality of postfilters, and the filter information D9 includes information indicating the plurality of postfilters.

The postfilter processing unit 22 selects the first postfilter and the second postfilter from the postfilter set including the plurality of postfilters, based on the first parameter and the second parameter included in the setting information D10. The first postfilter and the second postfilter may be two or more filters having different filter strengths.

In association with the parameter setting information D6 in the image encoder 10, the first parameter and the second parameter included in the setting information D10 include at least one of a quantization parameter, a partitioning size, a prediction type, and a bounding box. This makes it possible not only to apply an appropriate postfilter to each of the plurality of regions in the decoded image, but also to execute appropriate decoding processing.

When the parameter setting unit 13 sets the quantization parameter in the image encoder 10, the first parameter and the second parameter included in the setting information D10 each include the quantization parameter. This makes it possible to easily set the postfilters to be applied to the first region and the second region of the decoded image with the quantization parameter.

In association with FIG. 10, the postfilter processing unit 22 holds a lookup table in which a correspondence relationship between the values of the quantization parameters and the filter indexes assigned to the postfilters is described. The postfilter processing unit 22 applies the postfilter with filter index corresponding to the value of the quantization parameter applied to the block to be processed to the block to be processed. Note that the postfilter processing unit 22 may acquire information for generating the lookup table described with reference to FIG. 10 from the filter information D9.

In association with FIG. 11, the postfilter processing unit 22 applies the postfilter with filter index "0" to the block to be processed when the least significant bit of the quantization parameter applied to the block to be processed is an even number, and applies the postfilter with filter index "1" to the block to be processed when the least significant bit of the quantization parameter applied to the block to be processed is an odd number. Note that the postfilter processing unit 22 may acquire information for generating the correspondence relationship described with reference to FIG. 11 from the filter information D9.

When the parameter setting unit 13 sets the partitioning size in the image encoder 10, the first parameter and the second parameter included in the setting information D10 each include the partitioning size. This makes it possible to easily set the postfilters to be applied to the first region and the second region of the decoded image with the partitioning size.

In association with FIG. 15, the postfilter processing unit 22 holds a lookup table in which a correspondence relationship between the total numbers of pixels of the partitioning block (X×Y) and the filter indexes assigned to the postfilters is described. The postfilter processing unit 22 applies the postfilter with the filter index corresponding to the total number of pixels of the partitioning block to be processed to the block to be processed. Note that the postfilter processing unit 22 may acquire information for generating the lookup table described with reference to FIG. 15 from the filter information D9.

In association with FIG. 16, the postfilter processing unit 22 holds a lookup table in which a correspondence relationship between the aspect ratio of the partitioning block (X/Y) and the filter indexes assigned to the postfilters is described. The postfilter processing unit 22 applies the postfilter with the filter index corresponding to the aspect ratio of the partitioning block to be processed to the block to be processed. Note that the postfilter processing unit 22 may acquire information for generating the lookup table described with reference to FIG. 16 from the filter information D9.

In association with FIG. 17, the postfilter processing unit 22 holds a lookup table in which a correspondence relationship between the numbers of horizontal pixels (X) and vertical pixels (Y) of the partitioning block and the filter indexes assigned to the postfilters is described. The postfilter processing unit 22 applies the postfilter with the filter index corresponding to the numbers of the horizontal pixels and vertical pixels of the partitioning block to be processed to the block to be processed. Note that the postfilter processing unit 22 may acquire information for generating the lookup table described with reference to FIG. 17 from the filter information D9.

When the parameter setting unit 13 sets the prediction type in the image encoder 10, the first parameter and the second parameter included in the setting information D10 each include the prediction type. This makes it possible to easily set the postfilters to be applied to the first region and the second region of the decoded image with the prediction type.

In association with FIG. 18, the postfilter processing unit 22 applies the postfilter with filter index "0" to the block to be processed when the prediction type of the block to be processed is intra prediction, and applies the postfilter with filter index "1" to the block to be processed when the prediction type of the block to be processed is inter prediction. Note that the postfilter processing unit 22 may acquire information for generating the correspondence relationship described with reference to FIG. 18 from the filter information D9.

When the parameter setting unit 13 sets the bounding box in the image encoder 10, the first parameter and the second parameter included in the setting information D10 each include the bounding box. This makes it possible to easily set the postfilters to be applied to the first region and the second region of the decoded image with the bounding box.

In association with FIG. 19, the postfilter processing unit 22 applies the postfilter with filter index "0" to the block to be processed when the block to be processed is a region within the bounding box, and applies the postfilter with filter index "1" to the block to be processed when the block to be processed is a region outside the bounding box. Note that the postfilter processing unit 22 may acquire information for generating the correspondence relationship described with reference to FIG. 19 from the filter information D9.

When the image encoder 10 and the image decoder 20 share the correspondence relationship between the parameters and the prefilters and between the parameters and the postfilters in advance, the encoding of the filter information D5 or the filter information D4 to the bitstream D7 may be omitted.

In addition, the usage information D20 input to the prefilter processing unit 12 may be encoded into the bitstream D7 and transmitted from the image encoder 10 to the image decoder 20. The filter information D4 includes the usage information D20. In this case, the postfilter processing unit 22 may select one postfilter set from the plurality of postfilter sets based on the usage information D20 decoded by the decoding processing unit 21.

Further, when the parameter setting unit 13 sets a bounding box as a parameter, the parameter setting unit 13 may select one type of bounding box setting method from among a plurality of types of bounding box setting methods based on the usage information D20. The plurality of types of bounding box setting methods includes a bounding box setting method for person detection, a bounding box setting method for vehicle detection, and the like.

Figure 25:
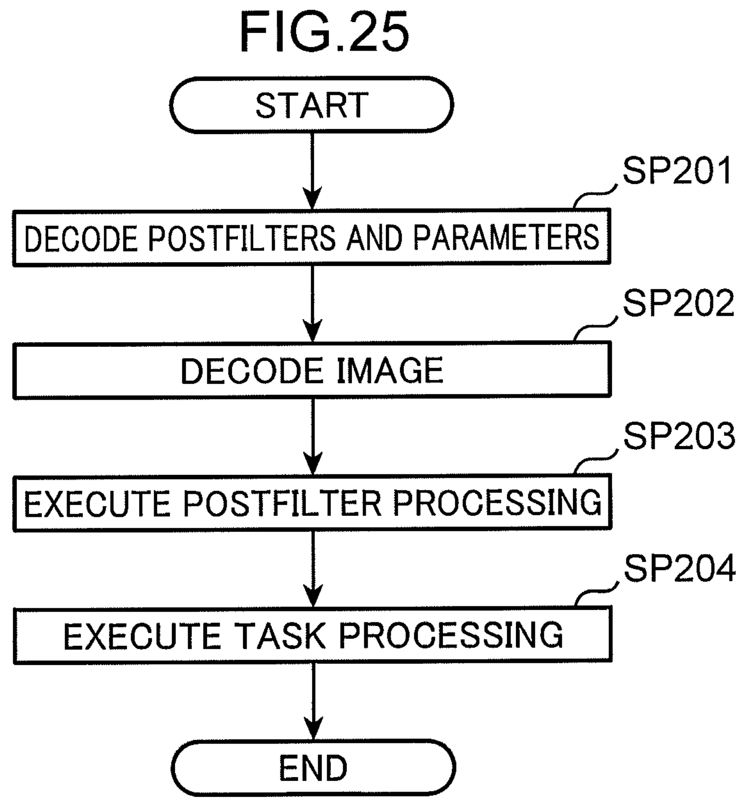
FIG. 25 is a flowchart illustrating a flow of processing executed by an image decoder.

FIG. 25 is a flowchart illustrating the flow of processing executed by the image decoder 20.

First, in step SP201, the decoding processing unit 21 decodes the first postfilter, the second postfilter, the first parameter, and the second parameter from the bitstream D7 received from the image encoder 10.

In step SP202, the decoding processing unit 21 then decodes the first region of the decoded image from the bitstream D7 based on the first parameter, and decodes the second region of the decoded image from the bitstream D7 based on the second parameter.

In step SP203, the postfilter processing unit 22 generates the second image by applying the first postfilter to the first region of the decoded image and applying the second postfilter to the second region of the decoded image.

Next, in step SP204, by using the second image, the task processing unit 23 executes task processing in accordance with the usage information D20 indicating the image usage, and outputs the result data D12 such as an inference result.

Figure 28:
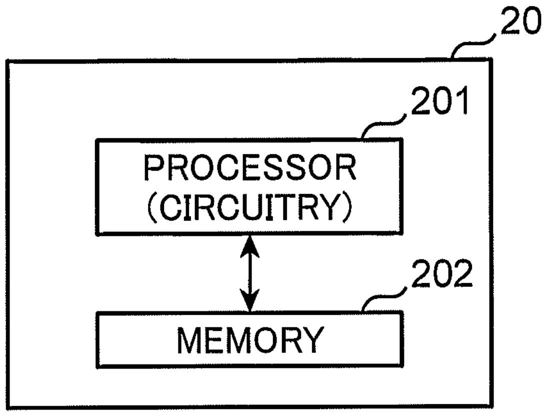
FIG. 28 is a diagram illustrating a simplified implementation example of the image decoder.

FIG. 28 is a diagram illustrating a simplified implementation example of the image decoder 20. The image decoder 20 is configured to include a processor 201 and a memory 202 connected to the processor 201. However, the memory 202 may be included in the processor 201. The processor 201 is circuitry that executes information processing. The processor 201 includes a CPU or a GPU. The memory 202 includes a semiconductor memory such as a ROM or a RAM, a magnetic disk, or an optical disk. The memory 202 stores information necessary for the processor 201 to execute decoding processing, postfilter processing, task processing, and the like. For example, the memory 202 stores the bitstream D7, the image data D8, the filter information D9, and the setting information D10. The memory 202 further stores a program. By the processor 201 to execute a program read from the memory 202, the processor 201 functions as the decoding processing unit 21, the postfilter processing unit 22, and the task processing unit 23.

With the image encoder 10 according to the present embodiment, an appropriate prefilter can be applied to each of the plurality of regions in the input image. Further, with the image decoder 20 according to the present embodiment, an appropriate postfilter can be applied to each of the plurality of regions in the decoded image. As a result, the number of bits of the bitstream D7 transmitted from the image encoder 10 to the image decoder 20 can be reduced, and the optimum filter processing can be executed in accordance with the image usage such as machine task or human vision.

The present disclosure is particularly useful for application to an image processing system including an image encoder that transmits an image and an image decoder that receives an image.

The invention claimed is:

1. An image encoder comprising:
circuitry; and
a memory connected to the circuitry,
wherein the circuitry, in operation,
determines a first region and a second region in an input image,
selects, based on usage information regarding image usage at an image decoder, a prefilter set including a first prefilter and a second prefilter from among a plurality of prefilter sets,
generates a first image from the input image by applying the first prefilter to the first region and the second prefilter to the second region,
determines a first parameter relating to the first region and a second parameter relating to the second region, and
generates a bitstream by encoding the first region based on the first parameter, encoding the second region based on the second parameter, encoding the first prefilter or a first postfilter corresponding to the first prefilter, and encoding the second prefilter or a second postfilter corresponding to the second prefilter.

2. The image encoder according to claim 1, wherein the image usage includes at least one machine task and human vision.

3. The image encoder according to claim 1, wherein the first parameter and the second parameter each include at least one of a quantization parameter, a partitioning size, a prediction type, and a bounding box.

4. The image encoder according to claim 3, wherein
the first parameter and the second parameter each include the quantization parameter, and
the circuitry determines a value of the quantization parameter, or a parity of the quantization parameter based on the first prefilter or the second prefilter.

5. The image encoder according to claim 3, wherein
the first parameter and second parameter each include the partitioning size, and
the circuitry determines a total number of pixels of the partitioning size, an aspect ratio of the partitioning size, or a number of horizontal pixels and a number of vertical pixels of the partitioning size based on the first prefilter or the second prefilter.

6. The image encoder according to claim 3, wherein
the first parameter and the second parameter each include the prediction type, and
the circuitry determines an intra prediction or an inter prediction as the prediction type based on the first prefilter or the second prefilter.

7. The image encoder according to claim 3, wherein
the first parameter and the second parameter each include the bounding box, and
the circuitry determines the bounding box based on the first prefilter or the second prefilter.

8. The image encoder according to claim 1, wherein the circuitry stores filter information in a header of the bitstream, the filter information relating to the first prefilter or the first postfilter and the second prefilter or the second postfilter.

9. The image encoder according to claim 8, wherein the filter information includes the usage information, the image usage being that of when the prefilter set including the first prefilter and the second prefilter is selected from the plurality of prefilter sets.

10. The image encoder according to claim 8, wherein
the header includes a supplemental enhancement information (SEI) region, and
the circuitry stores the filter information in the SEI region.

11. An image decoder comprising:
circuitry; and
a memory connected to the circuitry,
wherein the circuitry, in operation,
decodes a first prefilter or a first postfilter corresponding to the first prefilter, a second prefilter or a second postfilter corresponding to the second prefilter, a first parameter, and a second parameter from a bitstream,
decodes a first region of a first image from the bitstream based on the first parameter, and decodes a second region of the first image from the bitstream based on the second parameter, and
generates a second image by applying a first postfilter corresponding to the first prefilter decoded from the bitstream or the first postfilter decoded from the bitstream to the first region of the first image, and applying a second postfilter corresponding to the second prefilter decoded from the bitstream or the second postfilter decoded from the bitstream to the second region of the first image, and outputs the second image, and wherein the circuitry, in operation, selects, based on usage information regarding image usage of the second image, a postfilter set including the first postfilter and the second postfilter from among a plurality of postfilter sets including a postfilter set acquired from the bitstream.

12. The image decoder according to claim 11, wherein the image usage includes at least one machine task and human vision.

13. The image decoder according to claim 11, wherein the first parameter and the second parameter each include at least one of a quantization parameter, a partitioning size, a prediction type, and a bounding box.

14. The image decoder according to claim 13, wherein the first parameter and the second parameter each includes the quantization parameter, and the circuitry applies the first postfilter or the second postfilter based on a value of the quantization parameter or a parity of the quantization parameter.

15. The image decoder according to claim 13, wherein the first parameter and second parameter each include the partitioning size, and the circuitry applies the first postfilter or the second postfilter based on a total number of pixels of the partitioning size, an aspect ratio of the partitioning size, or a number of horizontal pixels and a number of vertical pixels of the partitioning size.

16. The image decoder according to claim 13, wherein the first parameter and the second parameter each include the prediction type, and the circuitry applies the first postfilter or the second postfilter based on whether the prediction type is an intra prediction or an inter prediction.

17. The image decoder according to claim 13, wherein the first parameter and the second parameter each include the bounding box, and the circuitry applies the first postfilter or the second postfilter based on whether to be a region within the bounding box or a region outside the bounding box.

18. The image decoder according to claim 11, wherein the circuitry extracts filter information from a header of the bitstream, the filter information relating to the first prefilter or the first postfilter and the second prefilter or the second postfilter.

19. The image decoder according to claim 18, wherein the filter information includes the usage information, the image usage being that of when the filter information is generated in the image encoder.

20. The image decoder according to claim 18, wherein the header includes a supplemental enhancement information (SEI) region, and the circuitry extracts the filter information from the SEI region.

21. An image encoding method comprising:

by an image encoder, determining a first region and a second region in an input image;

selecting, based on usage information regarding image usage at an image decoder, a prefilter set including a first prefilter and a second prefilter from among a plurality of prefilter sets, generating a first image from the input image by applying the first prefilter to the first region and applying the second prefilter to the second region;

determining a first parameter relating to the first region and a second parameter relating to the second region; and generating a bitstream by encoding the first region based on the first parameter, encoding the second region based on the second parameter, encoding the first prefilter or a first postfilter corresponding to the first prefilter, and encoding the second prefilter or a second postfilter corresponding to the second prefilter.

22. An image decoding method comprising:

by an image decoder, decoding a first prefilter or a first postfilter corresponding to the first prefilter, a second prefilter or a second postfilter corresponding to the second prefilter, a first parameter, and a second parameter from a bitstream, decoding a first region of a first image from the bitstream based on the first parameter, and decoding a second region of the first image from the bitstream based on the second parameter;

generating a second image by applying a first postfilter corresponding to the first prefilter decoded from the bitstream or the first postfilter decoded from the bitstream to the first region of the first image, and applying a second postfilter corresponding to the second prefilter decoded from the bitstream or the second postfilter decoded from the bitstream to the second region of the first image; and outputting the second image, wherein the circuitry, in operation, selects, based on usage information regarding image usage of the second image, a postfilter set including the first postfilter and the second postfilter from among a plurality of postfilter sets including a postfilter set acquired from the bitstream.

* * * * *